(12) United States Patent
Hasebe et al.

(10) Patent No.: US 10,707,705 B2
(45) Date of Patent: Jul. 7, 2020

(54) MOTOR WITH A STATOR HAVING SALIENT POLES AND METHOD OF MANUFACTURING THE MOTOR

(71) Applicant: TOKYO MOTRONICS CO., LTD., Nagano (JP)

(72) Inventors: Yoichi Hasebe, Nagano (JP); Tomoyuki Kodaira, Nagano (JP)

(73) Assignee: TOKYO MOTRONICS CO., LTD., Nagano (JP)

(*) Notice: Subject to any disclaimer, the term of this patent is extended or adjusted under 35 U.S.C. 154(b) by 176 days.

(21) Appl. No.: 15/857,552

(22) Filed: Dec. 28, 2017

(65) Prior Publication Data

US 2018/0123410 A1    May 3, 2018

Related U.S. Application Data

(63) Continuation-in-part of application No. PCT/JP2017/003118, filed on Jan. 30, 2017.

(30) Foreign Application Priority Data

Jun. 30, 2016   (JP) .................................. 2016-130119

(51) Int. Cl.
*H02K 3/18*      (2006.01)
*H02K 15/085*    (2006.01)
(Continued)

(52) U.S. Cl.
CPC ............... *H02K 1/24* (2013.01); *H02K 1/146* (2013.01); *H02K 1/265* (2013.01); *H02K 1/274* (2013.01);
(Continued)

(58) Field of Classification Search
CPC .......... H02K 1/24; H02K 1/146; H02K 1/265; H02K 1/274; H02K 3/18; H02K 3/28;
(Continued)

(56) References Cited

U.S. PATENT DOCUMENTS

2012/0169163 A1* 7/2012 Imai ..................... H02K 1/2746
                                                           310/71
2013/0043744 A1* 2/2013 Gayler ................... H02K 21/24
                                                           310/45

FOREIGN PATENT DOCUMENTS

JP          62-110468 A      5/1987
JP         2009213257 A  *   9/2009

OTHER PUBLICATIONS

Machine translation of JP-2009213257-A. (Year: 2009).*
International Search Report in PCT/JP2017/003118, dated Mar. 28, 2017.

* cited by examiner

*Primary Examiner* — Michael Andrews
(74) *Attorney, Agent, or Firm* — Hauptman Ham, LLP

(57) ABSTRACT

A motor includes: a rotor having a permanent magnet and a stator having salient poles with coils. First to sixth salient pole groups each having n salient poles are arranged along a circumferential direction. The salient pole groups to which electric currents of the same phase are supplied are displaced from each other by 180 degrees in mechanical angle. Each salient pole has a straight shape. A coil group on the salient poles of each salient pole group is formed by connecting the n coils in series, winding directions of the coils of adjacent salient poles are opposite to each other, the coils are connected to each other at a distal or a proximal end side of the salient pole by a connecting wire between the adjacent salient poles, and the connecting wires have a reverse relationship with respect to the distal or the proximal end side between adjacent slots.

5 Claims, 13 Drawing Sheets

(51) Int. Cl.
*H02K 1/24* (2006.01)
*H02K 21/22* (2006.01)
*H02K 1/14* (2006.01)
*H02K 1/26* (2006.01)
*H02K 1/27* (2006.01)
*H02K 15/03* (2006.01)
*H02K 21/16* (2006.01)

(52) U.S. Cl.
CPC ............... *H02K 3/18* (2013.01); *H02K 15/03* (2013.01); *H02K 15/085* (2013.01); *H02K 21/16* (2013.01); *H02K 21/22* (2013.01); *H02K 2213/03* (2013.01)

(58) Field of Classification Search
CPC ............ H02K 3/46; H02K 3/52; H02K 21/16; H02K 21/22; H02K 2213/03
USPC .............................................. 310/156.47, 208
See application file for complete search history.

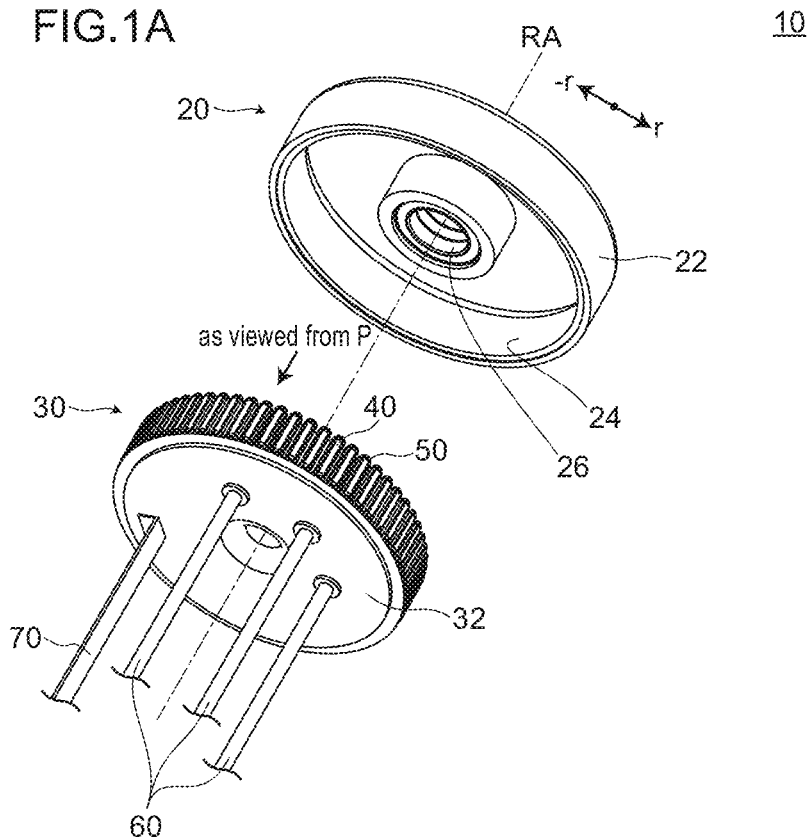
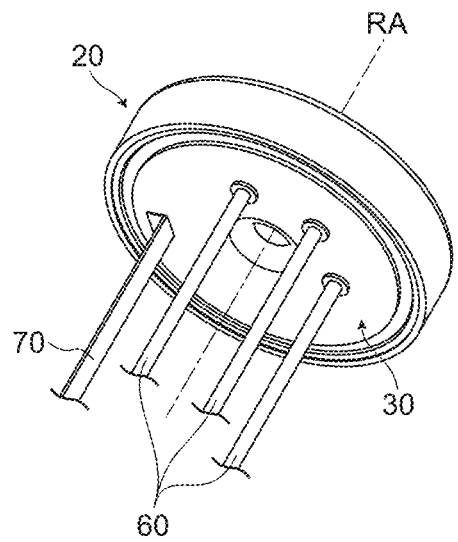
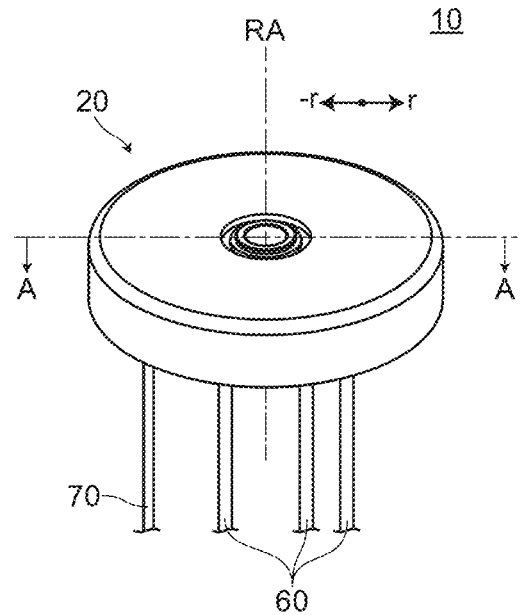

MOTOR WITH A STATOR HAVING SALIENT POLES AND METHOD OF MANUFACTURING THE MOTOR

RELATED APPLICATIONS

The present application is a Continuation-in-Part of International Application Number PCT/JP2017/003118, filed Jan. 30, 2017, which claims priority from Japanese Application Number 2016-130119, filed Jun. 30, 2016. The disclosures of the above-listed applications are hereby incorporated by reference herein in their entirety.

TECHNICAL FIELD

The present invention relates to a motor and a method of manufacturing a motor.

BACKGROUND ART

A power mechanism which incorporates a motor therein has been positively used in various vehicles, equipment and the like. Particularly, with respect to a power mechanism used in an applied product such as an electric vehicle such as a wheelchair, an electric stand-on two-wheeled vehicle (for example, Segway (registered trademark)) or the like, a nursing care robot or an electric reel for fishing, there has been a demand for a power mechanism which is small-sized and light-weighted but can output a high torque.

As a method for enabling a power mechanism to output a high torque, a method which uses a reduction gear is named as one example. In this method, a reduction gear which has a plurality of gears is connected to an output shaft (shaft) of a motor so that rotational speed produced by the motor is reduced whereby power whose torque is increased is transmitted from an output shaft of the reduction gear. However, this method additionally requires the reduction gear besides the motor and hence, the number of parts is increased whereby it is difficult to make the whole power mechanism small-sized and light-weighted. Further, problems such as an energy loss in the reduction gear or the generation of noises also newly arise more or less.

As another method, there has been known a direct driving method where a power mechanism is driven only by a motor without using a reduction gear. In this case, it is necessary to increase a torque which can be outputted to some extent.

As a motor which can output a relatively high torque, conventionally, there has been known a motor which uses salient poles (iron cores or cores having a projecting shape) (see patent document 1).

FIG. 16 is a view for describing a conventional motor 900. With respect to coils 950, only the coils which are mounted on salient poles 940 which belong to a first salient pole group 941G and a fourth salient pole group 944G are shown, and the coils mounted on other salient poles are omitted from the drawing. Symbols are not given to a second salient pole group 942G, a third salient pole group 943G, a fifth salient pole group 945G, a sixth salient pole group 946G, a second coil group 952G, a third coil group 953G, a fifth coil group 955G and a sixth coil group 956G.

As shown in FIG. 16, the conventional motor 900 is a motor 900 which includes: a rotor 920 having a permanent magnet 924 where a magnetic pole having an N pole and a magnetic pole having an S pole are alternately arranged along a circumferential direction; and a stator 930 configured such that the stator 930 has a plurality of salient poles 940 on which coils 950 are mounted respectively, the plurality of salient poles 940 are arranged along a circumferential direction, and distal end surfaces of the salient poles 940 opposedly face a surface of the permanent magnet 924 on which the magnetic poles are arranged.

In FIG. 16, the number of salient poles 940 which the stator 930 has is 12.

In the stator 930, the first salient pole group 941G consisting of two salient poles 940, the second salient pole group 942G consisting of two salient poles 940, the third salient pole group 943G consisting of two salient poles 940, the fourth salient pole group 944G consisting of two salient poles 940, the fifth salient pole group 945G consisting of two salient poles 940, and the sixth salient pole group 946G consisting of two salient poles 940 are arranged along a circumferential direction of the stator 930 in this order. Further, the first salient pole group 941G and the fourth salient pole group 944G are arranged so as to be positioned at positions displaced from each other by 180° in terms of a mechanical angle. The second salient pole group 942G and the fifth salient pole group 945G are arranged so as to be positioned at positions displaced from each other by 180° in terms of a mechanical angle. The third salient pole group 943G and the sixth salient pole group 946G are arranged so as to be positioned at positions displaced from each other by 180° in terms of a mechanical angle.

A first coil group 951G consisting of two coils 950 connected in series is mounted on two salient poles 940 of the first salient pole group 941G. A second coil group 952G consisting of two coils 950 connected in series is mounted on two salient poles 940 of the second salient pole group 942G. A third coil group 953G consisting of two coils 950 connected in series is mounted on two salient poles 940 of the third salient pole group 943G. A fourth coil group 954G consisting of two coils 950 connected in series is mounted on two salient poles 940 of the fourth salient pole group 944G. A fifth coil group 955G consisting of two coils 950 connected in series is mounted on two salient poles 940 of the fifth salient pole group 945G. A sixth coil group 956G consisting of two coils 950 connected in series is mounted on two salient poles 940 of the sixth salient pole group 946G.

A U-phase current is supplied to the first coil group 951G and the fourth coil group 954G, a V-phase current is supplied to the second coil group 952G and the fifth coil group 955G, and a W-phase current is supplied to the third coil group 953G and the sixth coil group 956G.

With such a conventional motor 900, the stator (armature) 930 includes the salient poles (core) 940 and hence, it is expected that the motor 900 can acquire a larger output compared to a coreless motor (see a left upper column and the like on page 2 of patent literature 1).

CITATION LIST

Patent Literature

PTL 1: JP-A-62-110468

SUMMARY OF INVENTION

Technical Problem

However, a torque generated by the conventional motor 900 is insufficient depending on an applied product and hence, recently, a motor which outputs a higher torque has been requested.

However, when a motor intends to output a higher torque, in general, the motor becomes large-sized and a weight of the motor is also increased.

That is, (i) when the number of turns of a coil is increased, a height of a cylinder of the coil (a height of the cylinder when the coil is formed into a cylindrical shape) and a thickness of the cylinder of the coil are increased. Corresponding to the increase of the height and the thickness of the cylinder of the coil, it is necessary for a slot in which the coil is accommodated (a groove between salient poles disposed adjacently to each other, also referred to as an iron core groove) to ensure a large space and hence, the motor becomes large-sized eventually. Further, (ii) when an electric current which flows into a coil is increased, it is necessary to use a winding having a large diameter resulting in large sizing of the coil and, eventually large sizing and the increase of weight of the motor.

On the other hand, (iii) to acquire a high torque, there may be also an approach where the number of magnetic poles of a permanent magnet and the number of salient poles (hereinafter, these numbers also collectively referred to as "the number of poles") are increased. However, when a product to which such a motor is applied is a product such as a wheelchair, an electric stand-on two-wheeled vehicle or a nursing care robot, it is necessary to restrict a diameter of the motor such that the diameter falls within a certain size. To increase the number of poles while suppressing a diameter of a motor to some extent such that the motor has a predetermined diameter, it is inevitably necessary to narrow a width of a slot. In this case, for example, it is difficult to insert a needle for guiding a winding into a deep area of the slot and hence, it is difficult to accommodate the winding in the slot. As a result, mounting of the coil on the salient pole becomes extremely difficult.

Further, in a case where a technique which winds a winding by a so-called distributed winding is used or a case where a technique where coils to which a U-phase current, a V-phase current and a W-phase current are supplied are arranged such that these coils are disposed adjacently to each other in order in a circumferential direction is used, assuming that the number of poles is increased, a total extension of connecting wires which extend from the slot to another slot is largely elongated as a whole thus spurring large sizing and the increase of weight of the motor.

In any one of the above-mentioned cases, an attempt to acquire a higher torque by increasing the number of poles in the conventional motor eventually leads to large sizing and the increase of weight of the motor.

In view of such circumstances, a motor having a diameter which is restricted to some extent such that the diameter falls within a predetermined size (not so much increased), having a relatively large number of poles and capable of outputting a high torque has not been practically used.

The present invention has been made in view of the above-mentioned circumstances, and it is an object of the present invention to provide a motor also suitable for direct driving which has a relatively large number of poles and can output a high torque while suppressing a size and a weight of the motor (while realizing downsizing and the reduction in weight of the motor).

Solution to Problem

[1] According to a first aspect of the present invention, there is provided a motor which includes: a rotor having a permanent magnet where a magnetic pole having an N pole and a magnetic pole having an S pole are alternately arranged along a circumferential direction; and a stator configured such that the stator has a plurality of salient poles on each of which a coil is mounted, the plurality of salient poles are arranged along the circumferential direction, and distal end surfaces of the salient poles oppositely face a surface of the permanent magnet on which the magnetic poles are arranged, wherein the number of salient poles which the stator has is 6n (n: a natural number of 4 or more), in the stator, a first salient pole group consisting of n number of first salient poles, a second salient pole group consisting of n number of second salient poles, a third salient pole group consisting of n number of third salient poles, a fourth salient pole group consisting of n number of fourth salient poles, a fifth salient pole group consisting of n number of fifth salient poles, and a sixth salient pole group consisting of n number of sixth salient poles are arranged along the circumferential direction of the stator in this order, the first salient pole group and the fourth salient pole group are arranged so as to be positioned at positions displaced from each other by 180° in terms of a mechanical angle, the second salient pole group and the fifth salient pole group are arranged so as to be positioned at positions displaced from each other by 180° in terms of a mechanical angle, and the third salient pole group and the sixth salient pole group are arranged so as to be positioned at positions displaced from each other by 180° in terms of a mechanical angle, a first coil group consisting of n number of said coils connected in series is mounted on n number of said first salient poles of the first salient pole group, a second coil group consisting of n number of said coils connected in series is mounted on n number of said second salient poles of the second salient pole group, a third coil group consisting of n number of said coils connected in series is mounted on n number of said third salient poles of the third salient pole group, a fourth coil group consisting of n number of said coils connected in series is mounted on n number of said fourth salient poles of the fourth salient pole group, a fifth coil group consisting of n number of said coils connected in series is mounted on n number of said fifth salient poles of the fifth salient pole group, and a sixth coil group consisting of n number of said coils connected in series is mounted on n number of said sixth salient poles of the sixth salient pole group, a U-phase current is supplied to the first coil group and the fourth coil group, a V-phase current is supplied to the second coil group and the fifth coil group, and a W-phase current is supplied to the third coil group and the sixth coil group, said each salient pole is formed into a flat straight shape along a radial direction of the stator, and in the respective first to sixth salient pole groups, the coils are mounted on the salient poles such that winding directions of the coils are set opposite to each other between the salient poles disposed adjacently to each other, and the coils are connected to each other at a distal end side or a proximal end side of the salient pole by a connecting wire which is a part of a winding which forms the coil between the salient poles disposed adjacently to each other, and the connecting wires have a reverse relationship with respect to the distal end side or the proximal end side between slots disposed adjacently to each other.

In the motor according to the first aspect of the present invention, each salient pole is formed into a flat straight shape along a radial direction of the stator, and each coil is mounted on each salient pole. On the other hand, (a) the coils are mounted on the salient poles such that winding directions of the coils are set opposite to each other between the salient poles disposed adjacently to each other and, further, (b) the coils are connected to each other at the distal end side or the proximal end side of the salient pole by the connecting wire which is a part of the winding which forms the coil between the salient poles disposed adjacently to each other, and the connecting wires have a reverse relationship with respect to the distal end side or the proximal end side between the slots disposed adjacently to each other. Further, (c) n number of coils having regularity described in the above-mentioned (a) and (b) are connected in series thus forming the i-th coil group (i: a natural number selected from a group ranging from 1 to 6).

By adopting the salient poles and the coils having the above-mentioned structures, it is possible to realize and provide the motor which is relatively small-sized and has a narrow slot width while allowing the motor to output a high torque with a relatively large number of poles (described later in detail).

In the motor according to the first aspect of the present invention, a coil group relating to one phase is mounted on n number of salient poles relating to one group such that the coils of the coil group are continuously connected in series. Further, the connecting wire connects the salient poles disposed adjacently to each other. With such a configuration, unlike a case where a technique which winds a winding by distributed winding is used or a case where a technique which winds a winding such that coils to which a U-phase current, a V-phase current and a W-phase current are supplied are arranged adjacently to each other in order in a circumferential direction, downsizing of the motor can be realized. Further, a length of the connecting wire can be minimized and hence, a total extension of the winding can be shortened whereby the reduction in weight of the motor can be realized. Still further, a resistance value of the whole winding in terms of a total extension can be suppressed and hence, enhancement of energy efficiency of the motor can be realized.

In the motor according to the first aspect of the present invention, the first salient pole group consisting of n number of first salient poles, the second salient pole group consisting of n number of second salient poles, the third salient pole group consisting of n number of third salient poles, the fourth salient pole group consisting of n number of fourth salient poles, the fifth salient pole group consisting of n number of fifth salient poles, and the sixth salient pole group consisting of n number of sixth salient poles are arranged along the circumferential direction of the stator in this order. The first salient pole group and the fourth salient pole group are arranged so as to be positioned at positions displaced from each other by 180° in terms of a mechanical angle (in point symmetry with respect to a rotary axis), the second salient pole group and the fifth salient pole group are arranged so as to be positioned at positions displaced from each other by 180° in terms of a mechanical angle (in point symmetry with respect to a rotary axis), and the third salient pole group and the sixth salient pole group are arranged so as to be positioned at positions displaced from each other by 180° in terms of a mechanical angle (in point symmetry with respect to a rotary axis). The coil groups are mounted on these six salient pole groups in a corresponding manner, a U-phase current is supplied to the first coil group and the fourth coil group, a V-phase current is supplied to the second coil group and the fifth coil group, and a W-phase current is supplied to the third coil group and the sixth coil group.

With such a configuration, for example, the salient pole groups which form a pair formed of the first salient pole group and the fourth salient pole group are arranged at positions displaced from each other by 180° in terms of a mechanical angle, and electric currents of the same phases are supplied to the coil groups which respectively correspond to these pair of salient pole groups. Accordingly, both salient pole groups are excited with a rotary axis sandwiched therebetween and hence, a problem where irregularities are generated in excitation due to an asymmetrical arrangement of the salient pole groups so that the rotor is pulled toward one side (a problem caused by eccentric excitation) does not arise whereby it is possible to acquire a motor which is rotated smoothly and stably.

As has been described above, according to the present invention, it is possible to acquire a motor having a relatively large number of poles while suppressing a size and a weight of the motor (while realizing downsizing and the reduction of weight of the motor). Further, with the increase of the number of poles, the motor can output a high torque mainly at the time of starting the motor and at the time of operating the motor at a low speed. In this manner, as a result, it is possible to provide a motor also suitable for direct driving which has a relatively large number of poles thus outputting a high torque while suppressing a size and a weight of the motor (while realizing downsizing and the reduction of weight of the motor).

[2] In the motor according to the first aspect of the present invention, it is preferable that a distance between the salient poles disposed adjacently to each other be set to a value which falls within a range of from 2.1 to 3.0 times as large as a diameter of the winding.

With respect to the motor having a narrow slot width where a distance between the salient poles disposed adjacently to each other is set to a value which falls within a range of from 2.1 to 3.0 times as large as a diameter of the winding, conventionally, it has been difficult to realize such a motor as has been described in "Background Art" and "Solution to Problem".

With the motor according to the first aspect of the present invention described in the above-mentioned [2], even in a case where a width of the slot is narrow compared to a diameter of the winding such that a distance between the salient poles disposed adjacently to each other is set to a value which falls within a range of from 2.1 times to 3.0 times as large as the diameter of the winding, it is possible to realize a desired motor suitable for such a case.

[3] In the motor according to the first aspect of the present invention, it is preferable that a diameter Φ of the stator be set to a value which falls within a range of 40 mm<Φ<200 mm, and the number of magnetic poles which the permanent magnet has and/or the number of salient poles fall within a range of from 60 to 240.

With respect to a motor where a diameter Φ of the stator is set to a value which falls within a range of 40 mm<Φ<200 mm, and the number of magnetic poles which the permanent magnet has and/or the number of salient poles fall/falls within a range of from 60 to 240, that is, with respect to a so-called motor having a large number of poles, conventionally, it has been difficult to realize such a motor as described in "Background Art" and "Solution to Problem".

With the motor according to the first aspect of the present invention described in the above-mentioned [3], even in a case where a diameter Φ of the stator is set to a value which falls within a range of 40 mm<Φ<200 mm, and the number of magnetic poles which the permanent magnet has and/or the number of salient poles fall/falls within a range of from 60 to 240, that is, with respect to a so-called motor having a large number of poles, it is possible to realize a desired motor suitable for such a case.

[4] In the motor according to the first aspect of the present invention, it is preferable that the number of magnetic poles which the permanent magnet of the rotor has be (6n±2).

With the motor according to the first aspect of the present invention described in the above-mentioned [4], the number of salient poles is 6n (n: a natural number of 4 or more) and the number of magnetic poles which the permanent magnet has is (6n±2) and hence, it is possible to acquire an advantageous effect (a) that the number of salient poles is an even number and hence, there is no possibility that "a problem caused by eccentric excitation (see the above-mentioned [1])" arises so that smooth and stable rotation can be acquired. Further, it is also possible to acquire an advantageous effect (b) that the difference between the number of salient poles and the number of magnetic poles which the permanent magnet has is 2 which is the least of the even number and hence, the least common number of number of salient poles and the number of magnetic poles which the permanent magnet has can be increased and hence, the so-called pulsation of a cogging torque can be suppressed.

[5] In the motor according to the first aspect of the present invention, it is preferable that the number of magnetic poles which the permanent magnet of the rotor has be (6n+2), and in the respective first to sixth salient pole groups, n number of salient poles which belong to the salient pole group be arranged while keeping a pitch of 360°/(6n+1) in terms of a mechanical angle, and an A salient pole which is one of said n number of salient poles belonging to the salient pole group and is positioned at an end of the salient pole group, and a B salient pole which is one of n number of salient poles belonging to another salient pole group disposed adjacently to the salient pole group, is positioned at an end of said another salient pole group, and is disposed adjacently to the A salient pole be arranged while keeping a pitch of {360°/(6n+1)}+360°/(6n+1)/6 in terms of a mechanical angle therebetween.

It is also possible to acquire a following advantageous effect (c). As described above, when n number of salient poles which belong to the same salient pole group are arranged while keeping a pitch of 360°/(6n+1) in terms of a mechanical angle in a state where the number of magnetic poles which the permanent magnet has is 6n+2, to locally observe the inside the same salient pole group, the number of salient poles present within one turn of 360° is converted in a pseudo manner into (6n+1) (hereinafter referred to as "the number of pseudo salient poles" which becomes a basis of calculation pitch for determining an arrangement pitch of the salient poles) and hence, the difference between "the number of pseudo salient poles" and the number of magnetic poles which the permanent magnet has becomes minimal, that is, 1. Accordingly, the least common number of "the number of pseudo salient poles" and the number of magnetic poles which the permanent magnet has can be further increased and hence, the so-called pulsation of a cogging torque can be further suppressed.

Here, assume a case where the whole circumference of 360° is divided by (6n+1) and the 6n number of salient poles are arranged at these dividing positions. In this case, the whole circumference of 360° is divided by the odd number and hence, the salient pole groups which form a pair (eventually, the salient poles belonging to these salient pole groups) are not arranged at positions displaced from each other by 180° in terms of a mechanical angle. Accordingly, in this case, "a problem caused by eccentric excitation" remains more or less.

In view of such circumstances, in the motor according to the first aspect of the present invention described in the above-mentioned [5], an A salient pole which is one of n number of salient poles belonging to the salient pole group and is positioned at an end of the salient pole group, and a B salient pole which is one of n number of salient poles belonging to another salient pole group disposed adjacently to the salient pole group, is positioned at an end of said another salient pole group, and is disposed adjacently to the A salient pole are arranged while keeping a pitch of {360°/(6n+1)}+360°/(6n+1)/6 in terms of mechanical angle therebetween. With such a configuration, it is possible to acquire an advantageous effect (d) that the salient pole groups which form a pair can be arranged at positions where the salient pole groups which form a pair (eventually the salient poles belonging to these salient pole groups) are displaced from each other by a mechanical angle of just 180° while eliminating an empty pitch amounting one salient pole and hence, it is possible to acquire a motor which performs smooth and stable rotation by suppressing "a problem caused by eccentric excitation".

[6] According to a second aspect of the present invention, there is provided a motor which includes: a rotor having a permanent magnet where a magnetic pole having an N pole and a magnetic pole having an S pole are alternately arranged along a circumferential direction; and a stator configured such that the stator has a plurality of salient poles on each of which a coil is mounted, the plurality of salient poles are arranged along the circumferential direction, and distal end surfaces of the salient poles oppositely face a surface of the permanent magnet on which the magnetic poles are arranged, wherein the number of salient poles which the stator has is 3 mn (m: a natural number of 2 or more, n: a natural number of 4 or more), in the stator, a (3k−2)th salient pole group consisting of n number of (3k−2)th salient poles, a (3k−1)th salient pole group consisting of n number of (3k−1)th salient poles, and a (3k)th salient pole group consisting of n number of (3k)th salient poles are arranged along the circumferential direction of the stator in this order (k: a natural number selected from 1 to m), a (3k−2)th coil group consisting of n number of said coils connected in series is mounted on n number of (3k−2)th salient poles of the (3k−2)th salient pole group, a (3k−1)th coil group consisting of n number of said coils connected in series is mounted on n number of said (3k−1) salient poles of the (3k−1)th salient pole group, and a (3k)th coil group consisting of n number of said coils connected in series is mounted on n number of said (3k)th salient poles of the (3k)th salient pole group, a U-phase current is supplied to the (3k−2)th coil group, a V-phase current is supplied to the (3k−1)th coil group, and a W-phase current is supplied to the (3k)th coil group, said each salient pole is formed into a flat straight shape along a radial direction of the stator, and in the respective first to (3m)th salient pole groups, the coils are mounted on the salient poles such that winding directions of the coils are set opposite to each other between the salient poles disposed adjacently to each other, and the coils are connected to each other at a distal end side or a proximal end side of the salient pole by a connecting wire which is a part of a winding which forms the coil between the salient poles disposed adjacently to each other, and the connecting wires have a reverse relationship with respect to the distal end side or the proximal end side between slots disposed adjacently to each other.

In the stator, the (3k−2)th salient pole group consisting of n number of (3k−2)th salient poles, the (3k−1)th salient pole group consisting of n number of (3k−1)th salient poles, and the (3k)th salient pole group consisting of n number of (3k)th salient poles are arranged along the circumferential direction of the stator in this order (k: a natural number selected from 1 to m). Further, corresponding to these salient pole groups, the (3k−2)th coil group consisting of n number of coils connected in series is mounted on n number of (3k−2)th salient poles of the (3k−2)th salient pole group. The (3k−1)th coil group consisting of n number of coils connected in series is mounted on n number of (3k−1)th salient poles of the (3k−1)th salient pole group, and the (3k)th coil group consisting of n number of coils connected in series is mounted on n number of (3k)th salient poles of the (3k)th salient pole group.

In the motor having such a configuration, due to excitation at the respective drive phases, a force acts on m number of places in one turn of 360° about a rotary axis RA of the rotor.

Accordingly, in the motor according to the second aspect of the present invention, by adopting the design where the number of salient pole groups and/or the number of coil groups are/is not limited to 6 and are/is increased to 9, 12, 15, . . . 3m, it is possible to allow a force $F_\beta$ by which the rotor 20 is attracted toward the rotary axis RA is dispersed to m number of places. Accordingly, it is possible to provide the motor where vibration and/or noise are/is further reduced.

[7] In the motor according to the second aspect of the present invention, it is preferable that a distance between the salient poles disposed adjacently to each other be set to a value which falls within a range of from 2.1 to 3.0 times as large as a diameter of the winding.

[8] In the motor according to the second aspect of the present invention, it is preferable that a diameter $\Phi$ of the stator be set to a value which falls within a range of 40 mm<$\Phi$<200 mm, and the number of magnetic poles which the permanent magnet has and/or the number of salient poles fall within a range of from 60 to 240.

[9] In the motor according to the second aspect of the present invention, it is preferable that the number of magnetic poles which the permanent magnet of the rotor has be (3 mn±m). Here, m and n are selected such that 3 mn±m becomes an even number.

[10] It is preferable that the motors according to the first and second aspects of the present invention be used for direct driving.

It is expected that a motor for direct driving can output a high torque at the time of starting the motor and at the time of operating the motor at a low speed and that the motor can acquire smooth and stable rotation.

The motor according to the present invention can output a high torque also at the time of starting the motor and at the time of operating the motor at a low speed, and can acquire smooth and stable rotation by suppressing vibration and pulsations of a cogging torque because of the following reasons (a) to (c). (a) The number of poles is relatively large. (b) The salient pole groups excited in the same phase are arranged as a pair at positions displaced from each other by 180° in terms of a mechanical angle. (c) The number of magnetic poles which the permanent magnet of the rotor has and the number of salient poles have a predetermined relationship (an arrangement pitch of the permanent magnet and an arrangement pitch of the salient poles have a predetermined relationship) and the like. Accordingly, with the invention described in the above-mentioned [10], it is possible to provide a motor suitable for direct driving.

[11] According to the present invention, there is also provided a motor manufacturing method for manufacturing the motor described in any one of the above-mentioned [1] to [10], wherein the motor manufacturing method includes: a winding forming step having: a j-th coil forming step (j: a natural number selected from a group ranging from 1 to n−2) for forming a j-th coil by winding the winding t times such that the winding is wound in a first rotational direction around a coil manufacturing tool when a yz plane is viewed in a plan view along an x axis; a j-th connecting wire forming step for forming a j-th connecting wire which becomes a portion connecting the j-th coil and a (j+1)th coil to each other by winding the winding by half way around in the first rotational direction when the yz plane is viewed in a plan view along the x axis; a (j+1)th coil forming step for forming the (j+1)th coil by winding the winding t times such that the winding is wound in the first rotational direction around the coil manufacturing tool when the yz plane is viewed in a plan view along the x axis; and a (j+1)th connecting wire forming step for forming a (j+1)th connecting wire which becomes a portion connecting the (j+1)th coil and a (j+2)th coil to each other by winding the winding by half way around in the first rotational direction when the yz plane is viewed in a plan view along the x axis, thus winding the winding around a rod-like coil manufacturing tool such that a plurality of coils connected in series are formed, wherein an axis parallel to a longitudinal direction of the rod-like coil manufacturing tool is defined as an x axis, an axis perpendicular to the x axis is defined as a y axis, and an axis perpendicular to the x axis and the y axis is defined as a z axis; an i-th coil group shaping step having at least: a j-th coil separation step for separating at least the j-th coil from the coil manufacturing tool; and a j-th connecting wire bending step for bending at least a portion of the j-th connecting wire such that an inner diameter of the j-th coil and an inner diameter of the (j+1)th coil are viewed in the same direction thus shaping a plurality of coils as a part of or a whole of an i-th coil group (i: a natural number selected from a group ranging from 1 to 3m, m: a natural number of 2 or more); and a coil fitting step for fitting respective coils belonging to the i-th coil group into corresponding i-th salient poles in the i-th salient pole group in the stator.

According to the motor manufacturing method of the present invention, in the winding forming step, a plurality of coils belonging to the i-th coil group are formed collectively and in a continuously connected manner by being wound around the coil manufacturing tool. Then, in the i-th coil group shaping step, the coils are shaped in a state where the coil can be easily fitted into the salient pole. Then, in the coil fitting step, the shaped coils which are formed in a continuously connected manner are collectively fitted on the salient poles so that the coils are mounted on the salient poles. Accordingly, it is unnecessary to mount the coils in such a manner that windings are directly wound around salient poles while being pushed to bottoms of slots and hence, even when a width of the slot is narrow, the coil can be mounted on the salient pole easily and efficiently in the form suitable for mass production.

Further, with the motor manufacturing method according to the present invention, the formation of the j-th coil formed by winding the winding t times around the coil manufacturing tool, the formation of the j-th connecting wire by winding the winding half way around the coil manufacturing tool, the formation of the (j+1)th coil by winding the winding t times around the coil manufacturing tool, and the formation of the (j+1)th connecting wire by winding the winding halfway around the coil manufacturing tool are performed such that all coils are wound around a first rotational direction which is the same direction without changing the winding direction in the course of winding and hence, the winding forming step can be performed in the form suitable for efficient mass production.

[12] In the motor manufacturing method according to the present invention, it is preferable that the coil manufacturing tool include a fitting portion disposed on an inner side of the formed coil, and assuming a size of the fitting portion in a longitudinal direction as a first size in the winding forming step when a yz plane of the fitting portion is viewed in a plan view along the x axis, in the j-th coil separation step of the i-th coil group shaping step, the size of the fitting portion be changed to a second size smaller than the first size, and the j-th coil be separated from the fitting portion.

With the motor manufacturing method described in the above-mentioned [12], in the j-th coil separation step, the size of the fitting portion is changed to a second size smaller than a first size maintained in the winding forming step thus narrowing a width of the fitting portion and hence, gap can be formed between an inner side of the coil and an outer side of the fitting portion. Accordingly, the separation of the coil can be performed easily and hence, the j-th coil separation step can be performed without collapsing a shape of the coil at the time of separating the coil and in the form suitable for further efficient mass production.

BRIEF DESCRIPTION OF DRAWINGS

FIG. 1A to FIG. 1C are perspective views for describing a motor 10 according to an embodiment 1.

DESCRIPTION OF EMBODIMENTS

Figure 2:
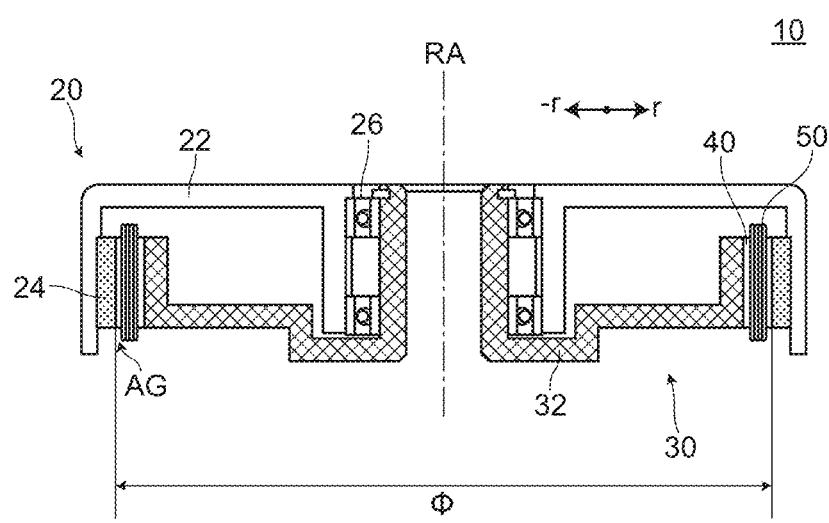
FIG. 2 is a cross-sectional view for describing the motor 10 according to the embodiment 1.

Hereinafter, a motor and a manufacturing method of manufacturing a motor according to the present invention are described in detail with reference to embodiments shown in the drawings. Respective illustrations in the drawings are merely shown schematically, and sizes of respective constitutional elements, ratios in size between the respective constitutional elements do not always strictly reflect actual sizes.

Embodiment 1

1. Basic Structure of Motor 10 According to Embodiment 1

Figure 3A:
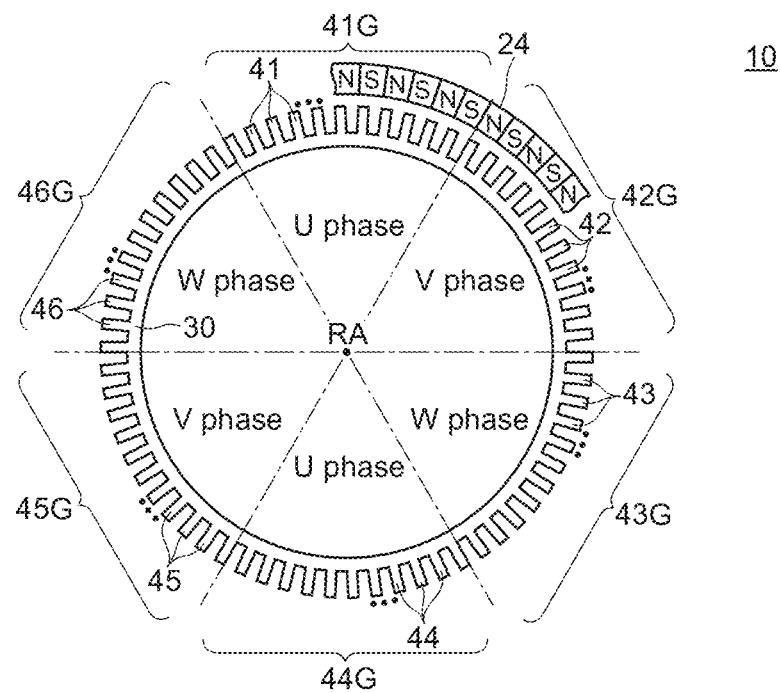
FIG. 3A and FIG. 3B are views showing a main part for describing the motor 10 according to the embodiment 1.
Figure 3B:
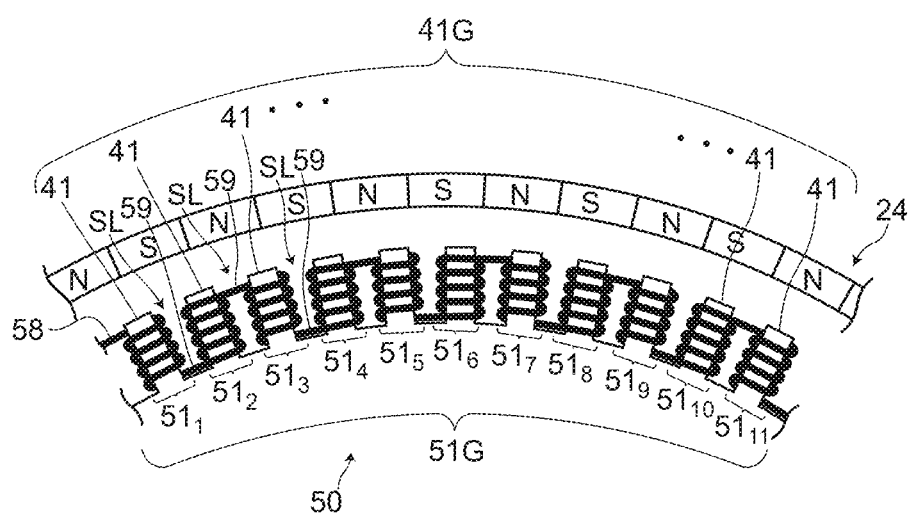
Figure 4A:
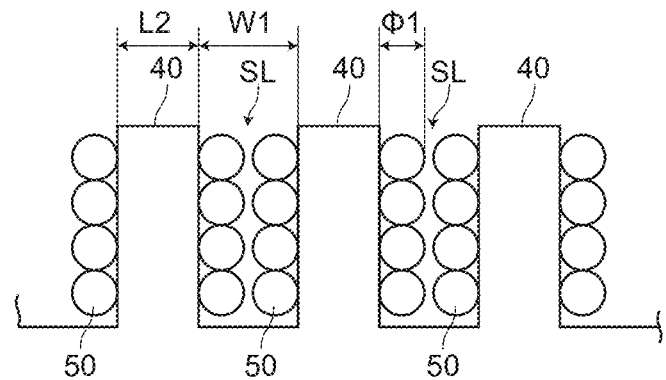
FIG. 4A and FIG. 4B are views for describing the relationship in size between salient poles 40, slots SL, and winding 58 according to the embodiment 1.
Figure 4B:
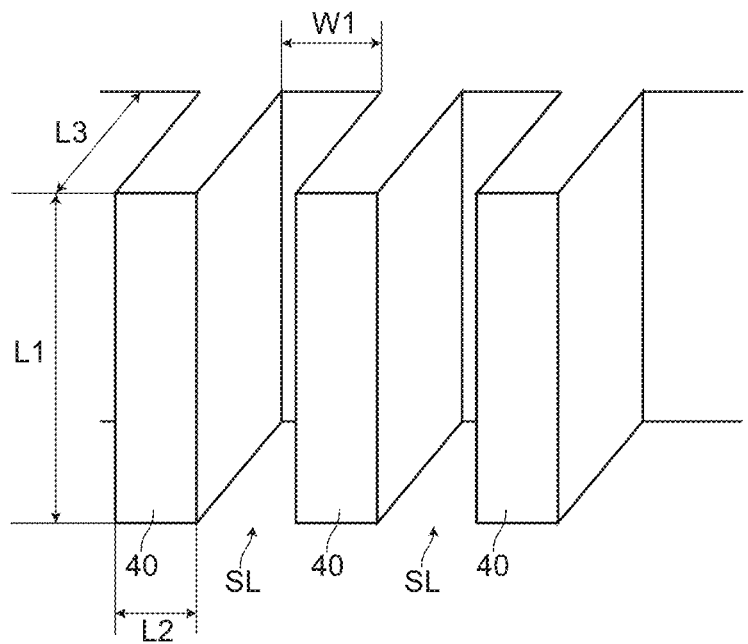

FIG. 1A to FIG. 1C, FIG. 2, FIG. 3A to FIG. 3B and FIG. 4A to FIG. 4B are views for describing a motor 10 according to an embodiment 1. FIG. 1A is a perspective view showing a state where the motor 10 is disassembled. FIG. 1B and FIG. 1C are perspective views showing a state where a rotor 20 and a stator 30 are assembled to each other. FIG. 2 is a cross-sectional view of the motor 10 taken along a plane A-A in FIG. 1C. FIG. 3A is a view showing an arrangement of salient poles 40 when the motor 10 is viewed in a plan view along a rotary axis RA. In FIG. 3A, a part of the permanent magnet 24 is also shown. Further, boundaries each of which is formed between each two salient pole groups among first salient pole group 41G to sixth salient pole group 46G are indicated by a dotted chain line respectively for the sake of convenience. FIG. 3B is a view showing the first salient pole group 41G, a first coil group 51G, and the permanent magnet 24 when the motor 10 is viewed in a plan view along the rotary axis RA. FIG. 4A and FIG. 4B are views for describing the relationship in size between salient poles 40, slots SL, and a winding 58 according to the embodiment 1. FIG. 4A is a view showing a configuration shown in FIG. 3B in an enlarged manner, and FIG. 4B is a perspective view showing only the salient poles 40 by taking out the salient poles 40 as viewed from the outside of the circumference of the motor 10. With respect to parts which are given the same symbols in common such as the first salient poles 41, connecting wires 59 and the slots SL, there may be a case where a symbol is given to some of these parts, and the symbol is not given to remaining parts, for example (the same definition being adopted in the description made hereinafter).

As shown in FIG. 1A to FIG. 1C and FIG. 2, the motor 10 according to the embodiment 1 includes: a rotor 20 having the permanent magnet 24; and a stator 30 configured such that the stator 30 has a plurality of salient poles 40 on each of which a coil 50 is mounted, the plurality of salient poles 40 are disposed along a circumferential direction of the stator 30, and distal end surfaces of the salient poles 40 opposedly face a plane on which magnetic poles of the permanent magnet 24 are arranged.

The permanent magnet 24 is configured such that magnetic poles formed of N poles and S poles are alternately arranged at an approximately equal pitch along the circumferential direction along which the motor 10 rotates (see FIG. 3A and FIG. 3B), and the permanent magnet 24 is arranged on an inner peripheral surface of a rotor body 22 (see FIG. 1A and FIG. 2).

The salient poles 40 are portions around which the coil 50 is wound, and are also referred to as an "iron core" or a "core" besides the "salient poles". The salient poles 40 are connected to a stator base body 32. Distal end surfaces of the salient poles 40 and the permanent magnet 24 opposedly face each other with a distance of an air gap AG therebetween (see FIG. 2).

Bearings 26 are disposed on the rotor body 22 around the rotary axis RA, and the bearings 26 are brought into contact with the stator 30. From the motor 10, power lead wires 60 for supplying an electric current to the coils 50, and a signal lead wire 70 for transmitting signals of Hall elements (not shown in the drawing) and the like are pulled out from the motor 10 (see FIG. 1A, FIG. 1B and FIG. 2).

2. Detailed Structure of Motor 10 According to Embodiment 1

(1) Salient Pole Group

The number of salient poles 40 which the stator 30 has is 6n in total (n: a natural number of 4 or more). For example, in the stator 30 shown in FIG. 3A, n is set to 11 (n=11), and the stator 30 has 66 salient poles 40 in total.

These salient poles 40 are divided into six salient pole groups virtually. That is, as shown in FIG. 3A, in the stator 30, a first salient pole group 41G consisting of n number of first salient poles 41, a second salient pole group 42G consisting of n number of second salient poles 42, a third salient pole group 43G consisting of n number of third salient poles 43, a fourth salient pole group 44G consisting of n number of fourth salient poles 44, a fifth salient pole group 45G consisting of n number of fifth salient poles 45, and a sixth salient pole group 46G consisting of n number of sixth salient poles 46 are arranged along a circumferential direction of the stator 30 in this order. In FIG. 3A, the salient pole groups are defined as the first salient pole group 41G to the sixth salient pole group 46G in a CW direction (in a clockwise direction) as viewed in a direction toward a surface of a paper on which FIG. 3A is drawn. Further, the first salient pole group 41G and the fourth salient pole group 44G are arranged so as to be positioned at positions displaced from each other by 180° in terms of a mechanical angle (in point symmetry with respect to the rotary axis RA), the second salient pole group 42G and the fifth salient pole group 45G are arranged so as to be positioned at positions displaced from each other by 180° in terms of a mechanical angle (in point symmetry with respect to the rotary axis RA), and the third salient pole group 43G and the sixth salient pole group 46G are arranged so as to be positioned at positions displaced from each other by 180° in terms of a mechanical angle (in point symmetry with respect to the rotary axis RA).

(2) Coil Group

As shown in FIG. 3B, a first coil group 51G consisting of n number of coils connected in series is mounted on n number of first salient poles 41 of the first salient pole group 41G. That is, unlike a case where coils are mounted by winding windings in a distributed manner and a case where coils are mounted by winding windings such that a coil to which a U-phase current is supplied, a coil to which a V-phase current is supplied, and a coil to which a W-phase current is supplied are disposed adjacently to each other, one coil group is formed by connecting n number of coils in series (in a so-called series manner or a so-called cascade manner).

A second coil group 52G to a sixth coil group 56G are also configured in the same manner as the above-mentioned first coil group 51G. That is, the second coil group 52G consisting of n number of coils connected in series is mounted on n number of second salient poles 42 of the second salient pole group 42G, the third coil group 53G consisting of n number of coils connected in series is mounted on n number of third salient poles 43 of the third salient pole group 43G, the fourth coil group 54G consisting of n number of coils connected in series is mounted on n number of fourth salient poles 44 of the fourth salient pole group 44G, the fifth coil group 55G consisting of n number of coils connected in series is mounted on n number of fifth salient poles 45 of the fifth salient pole group 45G, and the sixth coil group 56G consisting of n number of coils connected in series is mounted on n number of sixth salient poles 46 of the sixth salient pole group 46G (not shown in FIG. 3B).

A U-phase current is supplied to the first coil group 51G and the fourth coil group 54G, a V-phase current is supplied to the second coil group 52G and the fifth coil group 55G, and a W-phase current is supplied to the third coil group 53G and the sixth coil group 56G (see the U phase, the V phase and the W phase shown in FIG. 3A). That is, the salient pole groups which form a pair are disposed at positions displaced from each other by 180° in terms of a mechanical angle, and an electric current of the same phase is supplied to the salient pole groups which form a pair. Accordingly, both salient pole groups which form a pair are excited at the same timing with the rotary axis RA sandwiched therebetween.

Figure 5:
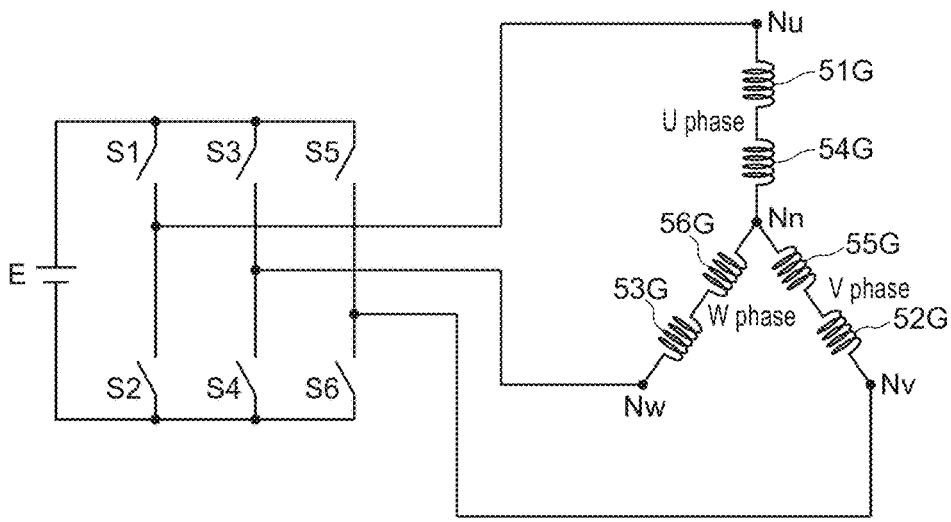
FIG. 5 is a circuit diagram for describing a connection relationship for driving the motor 10 according to the embodiment 1.

In the motor 10 according to the embodiment 1, the first coil group 51G and the fourth coil group 54G are connected in series, the second coil group 52G and the fifth coil group 55G are connected in series, and the third coil group 53G and the sixth coil group 56G are connected in series (see FIG. 5).

(3) Shape of Salient Pole

The salient poles 40 on which the coil 50 is mounted (symbols 41 to 46 being given to salient poles in each salient pole group, the symbols being given in the same manner in the description made hereinafter) are formed into a flat straight shape along a radial direction of the stator 30 (see FIG. 1A to FIG. 4B).

Figure 16:
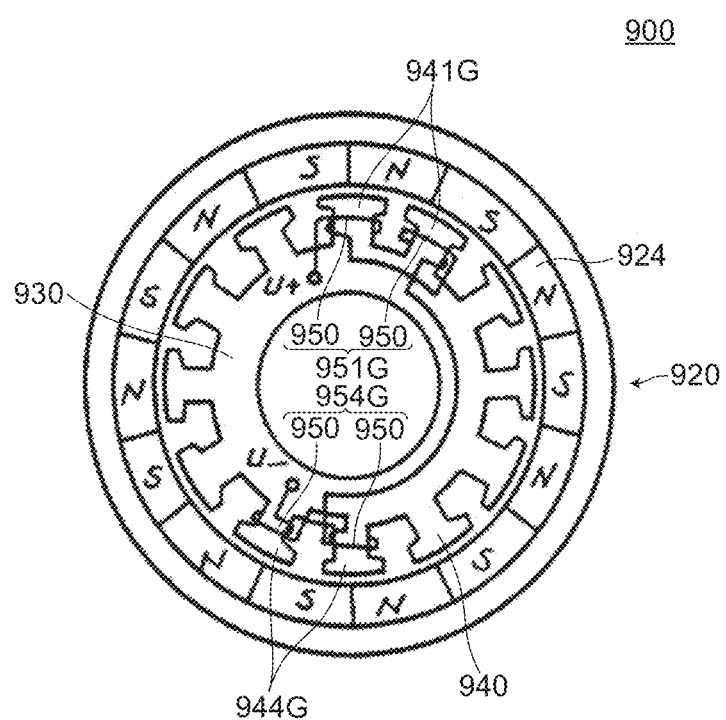
FIG. 16 is a view for describing a conventional motor 900.

In this specification, "salient pole having a straight shape" means a salient pole which differs in shape from a so-called umbrella-shaped salient pole where a width of a distal end of the pole is wider than a width of a proximal end of the salient pole (see FIG. 16). It is preferable that the straight-shaped salient pole 40 be flattened along a radial direction of the stator 30 without having a specific recessed portion or projecting portion. Further, the salient pole 40 may be formed into a shape where the salient pole 40 has a coplanar surface from a distal end to a proximal end of the salient pole 40, or may be formed such that a width of a distal end of the salient pole 40 is slightly narrowed compared to a width of a proximal end of the salient pole 40 so that side surfaces of the salient pole 40 are formed into a tapered shape as a whole. The side surfaces of the salient pole 40 may be tapered in a straight-line shape or in a gently curved shape.

The motor 10 according to the embodiment 1 adopts such a salient pole structure and hence, for example, a needle for guiding a winding can be easily inserted into a deep area of the slot, or a coil which is wound preliminarily can be easily fitted onto the salient pole.

(4) Coil Mounting Structure

As shown in FIG. 3B, in the respective first salient pole group 41G to the sixth salient pole group 46G, the coil 50 is mounted on the salient poles such that winding directions of the coils are reversed between the salient poles disposed adjacently to each other when the inside of each salient pole group is viewed locally.

For example, when the inside of the salient pole group is viewed in a direction of the rotary axis RA (−r direction) from the outside of the circumference along which the motor 10 rotates, a winding direction of a coil $51_1$ is directed in a CW direction, a winding direction of a coil $51_2$ is directed in a CCW direction (counterclockwise direction), a winding direction of a coil $51_3$ is directed in the CW direction, and a winding direction of a coil $51_4$ is directed in the CCW direction. A winding direction of a subsequent coil $51_j$ is also decided in accordance with the same rule.

With such a configuration, when an electric current of the same phase flows in the coil group, a magnetic pole having an N pole and a magnetic pole having an S pole alternately appear on distal end sides of the salient poles mounted on the coil. Assuming a case where an electric current flows in a direction from the coil $51_1$ to a coil $51_{11}$ of the first coil group 51G in FIG. 3B, an S pole appears on the distal end side of the salient pole mounted on the coil $51_1$, and an N pole appears on the distal end side of the salient pole mounted on a coil $51_2$.

As shown in FIG. 3B, in the respective first salient pole group 41G to the sixth salient pole group 46G, the coils 50 are connected to each other at a distal end side or a proximal end side of the salient pole 40 (indicated by symbol 41 in FIG. 3B, the symbol being given in the same manner in the description made hereinafter) by the connecting wire 59 which is a part of the winding 58 which forms the coil 50 between the salient poles disposed adjacently to each other, and the connecting wires 59 have a reverse relationship with respect to the distal end side or the proximal end side between slots SL disposed adjacently to each other.

For example, the connecting wire 59 extends in the slot SL formed between the coil $51_1$ and the coil $51_2$ on a proximal end side of the salient poles, the connecting wire 59 extends in the slot SL formed between the coil $51_2$ and the coil $51_3$ on a distal end side of the salient poles, and the connecting wire 59 extends in the slot SL formed between the coil $51_3$ and the coil $51_4$ on a proximal end side of the salient poles. As described above, the connecting wire 59 alternately extends on a distal end side of the salient poles and on a proximal end side of the salient poles.

In this specification, the distal end side of the salient poles 40 means a side in a direction toward the outside of the circumference along which the motor 10 rotates (r direction) from the rotary axis RA, and the proximal end side of the salient poles 40 means a side in a direction toward the rotary axis RA from the outside of the circumference along which the motor 10 rotates (−r direction).

(5) Size and the Like

In the motor 10 according to the embodiment 1, assuming a diameter of the stator 30 as Φ (see FIG. 2), the diameter Φ of the stator 30 is set to a value which falls within a range of from more than 40 mm to less than 200 mm, and the number of magnetic poles which the permanent magnet 24 has and/or the number of salient poles 40 are/is set to values which fall within a range of from 60 to 240.

As shown in FIG. 4A and FIG. 4B, in the motor 10 according to the embodiment 1, a distance W1 between the salient poles 40 disposed adjacently to each other is set to a value which falls within a range of 2.1 to 3.0 times as large as a diameter φ1 of the winding 58.

The salient pole 40 according to the embodiment 1 is formed such that, as viewed in the −r direction, a length L1 of the salient pole 40 in a direction perpendicular to the circumferential direction of the motor 10 is larger than a length L2 of the salient pole 40 in the circumferential direction of the motor 10.

(6) Relationship Between the Number of Salient Poles and the Number of Magnetic Poles which Permanent Magnet Has The motor 10 according to the embodiment 1 has 6n number of salient poles and hence, the number of magnetic poles which the permanent magnet 24 of the rotor 20 has is set to (6n±2).

(7) Application of Motor 10

The motor 10 according to the embodiment 1 is mainly used for direct driving.

3. Driving of Motor 10 According to Embodiment 1

Figure 6:
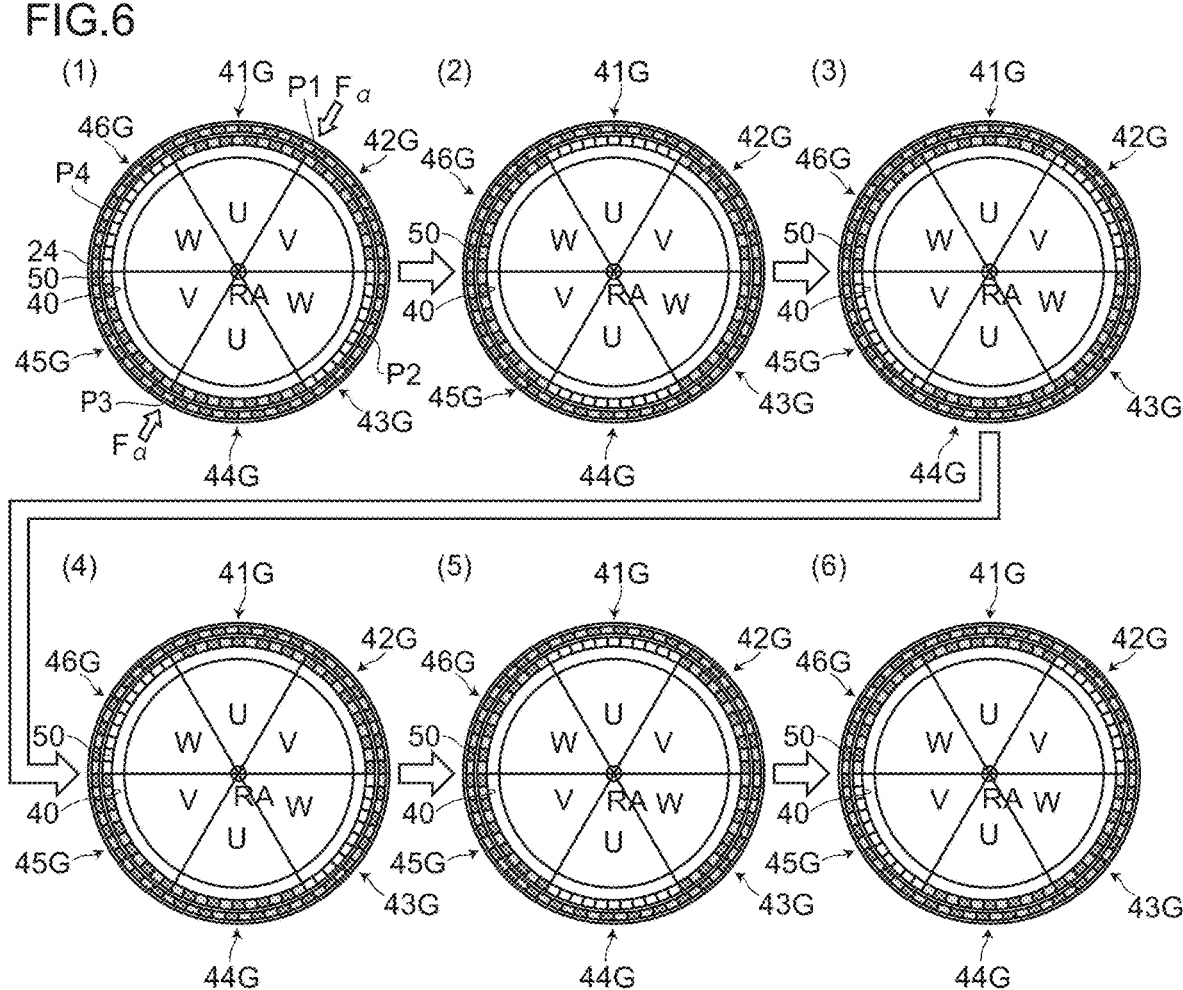
FIG. 6 is a view for describing a driving state of the motor 10 according to the embodiment 1.

FIG. 5 is a circuit diagram for describing the connection relationship for driving the motor 10 according to the embodiment 1. FIG. 6 is a view for describing a state where the motor 10 according to the embodiment 1 is being driven (n being set to 11 (n=11)). In the first salient pole group 41G to the sixth salient pole group 46G, the salient pole groups which are excited by making an electric current to flow in the coil groups corresponding to the excited salient pole groups are indicated by hatching. Further, the n number of salient poles relating to the excited salient pole groups and the permanent magnet 24 are indicated by hatching while changing a gray level of hatching corresponding to polarity (an N pole or an S pole).

As a method of driving the motor 10, any method may be adopted. However, for example, in the embodiment 1, as shown in FIG. 5 and FIG. 6, a driving method is adopted where a drive circuit formed of a so-called star-connection is used, and a rotating magnetic field is applied to the first salient pole group 41G to the sixth salient pole group 46G by driving such a drive circuit.

As shown in FIG. 5, the drive circuit according to the embodiment 1 is configured such that one end of the first coil group 51G and one end of the fourth coil group 54G are connected to each other, one end of the second coil group 52G and one end of the fifth coil group 55G are connected to each other, one end of the third coil group 53G and one end of the sixth coil group 56G are connected to each other, the other end of the first coil group 51G is connected to a node Nu, the other end of the second coil group 52G is connected to a node Nv, the other end of the third coil group 53G is connected to a node Nw, and the other end of the fourth coil group 54G, the other end of the fifth coil group 55G and the other end of the sixth coil group 56G are connected to a node Nn. Between a high potential side and a low potential side of a power source E, switches S1, S2 are connected to each other in series, switches S3, S4 are connected to each other in series, and switches S5, S6 are connected to each other in series respectively. Further, a connection node between the switches S1, S2 is connected to the node Nu, a connection node between the switches S3, S4 is connected to the node Nw, and a connection node between the switches S5, S6 is connected to the node Nv respectively.

In this manner, in a state where the drive circuit is configured as a circuit where the first coil group 51G to the sixth coil group 56G are connected by a so-called star connection, by controlling ON and OFF of the switches S1 to S6 suitably, an electric current flows between two nodes selected from three nodes consisting of the node Nu, the node Nv and the node Nw so that a rotating magnetic field is applied to the first salient pole group 41G to the sixth salient pole group 46G as shown in FIG. 6.

To be more specific, in a first phase, an electric current is made to flow in the coil groups corresponding to a U phase and a V phase (the first coil group 51G, the second coil group 52G, the fourth coil group 54G, and the fifth coil group 55G) thus exciting the first salient pole group 41G, the second salient pole group 42G, the fourth salient pole group 44G and the fifth salient pole group 45G (see (1) of FIG. 6). In the same phase, both salient pole groups which form a pair are excited at the same timing with the rotary axis RA sandwiched therebetween (the drive circuit being operated in the same manner in phases described hereinafter).

Next, in a second phase, an electric current is made to flow in the coil groups corresponding to a V phase and a W phase (the second coil group 52G, the third coil group 53G, the fifth coil group 55G, and the sixth coil group 56G) thus exciting the second salient pole group 42G, the third salient pole group 43G, the fifth salient pole group 45G, and the sixth salient pole group 46G (see (2) of FIG. 6).

Also in a third phase and succeeding phases, in the same manner as described above, the coil groups in which an electric current is made to flow are shifted in the CW direction each time the phase changes so that the salient pole groups to be excited are shifted in the CW direction. When the driving operation up to the sixth phase is finished, the driving operation returns to the first phase again, and the same driving operation is repeated so that a rotating magnetic field is applied to the first salient pole group 41G to the sixth salient pole group 46G. Along with such a driving operation, the rotor 20 is rotated.

4. Manner of Operation and Advantageous Effects of Motor 10 According to Embodiment 1

(1) Manner of Operation and Advantageous Effect Acquired by Increasing the Number of Poles When the number of poles (the number of magnetic poles of the permanent magnet and/or the number of salient poles) of the motor 10 are/is set to a relatively large number, an angle that the rotor 20 is to be rotated per one excitation switching (switching of a phase in case of the above-mentioned driving method of the motor 10) is set smaller than an angle when the number of poles is set to a small number. As a result, a torque at the time of starting the motor 10 can be increased as in a case where a vehicle travels at a low gear, for example.

In addition, when the number of poles is set to a large number, with the narrowing of an arrangement pitch of the magnetic poles, a thickness of the permanent magnet 24 can be decreased contrary to the increase of the number of poles due to the relationship between the arrangement pitch of the magnetic poles and permeance. In this manner, by decreasing a thickness of the permanent magnet 24, downsizing and reduction of weight of the motor 10 can be realized. In addition, the permanent magnet 24 arranged in the circumferential direction of the rotor 20 which is a rotary body is light-weighted and hence, such a configuration can contribute to rapid acceleration and deceleration of the motor.

(2) Acquisition of Both Increase of the Number of Poles and the Downsizing and Reduction of Weight of Motor However, as described previously, in general, an attempt to acquire a higher torque by increasing the number of poles leads to large sizing and the increase of weight of the motor.

Accordingly, in the motor 10 according to the embodiment 1, each salient pole 40 is formed into a flat straight shape along a radial direction (r direction) of the stator 30, and each coil 50 is mounted on each salient pole 40. On the other hand, (a) the coils 50 are mounted on the salient poles 40 such that winding directions of the coils 50 are set opposite to each other between the salient poles disposed adjacently to each other and, further, (b) the coils 50 are connected to each other at the distal end side or the proximal end side of the salient pole 40 by the connecting wire 59 which is a part of the winding 58 which forms the coil between the salient poles disposed adjacently to each other, and the connecting wires 59 have a reverse relationship with respect to the distal end side or the proximal end side between the slots SL disposed adjacently to each other. Further, (c) n number of coils 50 having regularity described in the above-mentioned (a) and (b) are connected in series thus forming an i-th coil group 5iG (i: a natural number selected from a group ranging from 1 to 6).

By adopting the salient poles 40 and the coils 50 having the above-mentioned structures, it is possible to realize and provide the motor which is relatively small-sized and has a narrow slot width while allowing the motor to output a high torque with a relatively large number of poles.

(3) Shortening of Winding 58

In the motor 10 according to the embodiment 1, for example, the first coil group 51G consisting of n number of coils 50 connected in series is mounted on n number of first salient poles 41 of the first salient pole group 41G, and the coils 50 are connected to each other at a distal end side or a proximal end side of the first salient pole 41 by the connecting wire 59 which is a part of the winding 58 which forms the coils 50 between the first salient poles 41 disposed adjacently to each other. That is, a coil group relating to one phase is mounted on n number of salient poles relating to one group such that the coils of the coil group are continuously connected in series, and the connecting wire extends between the salient poles disposed adjacently to each other.

With such a configuration, unlike a case where a winding is wound by distributed winding or a case where a winding is wound such that coils to which a U-phase current, a V-phase current and a W-phase current are supplied are arranged adjacently to each other in order in a circumferential direction, it is unnecessary to additionally provide a space for routing the wiring, and downsizing of the motor can be realized. Further, a length of the connecting wire can be minimized and hence, a total extension of the wiring can be also shortened whereby the reduction in weight of the motor can be realized. Still further, a resistance value of the whole wiring in terms of a total extension can be suppressed and hence, energy efficiency of the motor can be enhanced.

(4) Excitation of Salient Pole Groups Disposed in Point Symmetry with Rotary Axis RA Sandwiched Therebetween In the motor 10 according to the embodiment 1, the first salient pole group 41G consisting of n number of first salient poles 41, the second salient pole group 42G consisting of n number of second salient poles 42, the third salient pole group 43G consisting of n number of third salient poles 43, the fourth salient pole group 44G consisting of n number of fourth salient poles 44, the fifth salient pole group 45G consisting of n number of fifth salient poles 45, and the sixth salient pole group 46G consisting of n number of sixth salient poles 46 are arranged along a circumferential direction of the stator 30 in this order. The first salient pole group 41G and the fourth salient pole group 44G are arranged so as to be positioned at positions displaced from each other by 180° in terms of a mechanical angle (in point symmetry with respect to the rotary axis RA), the second salient pole group 42G and the fifth salient pole group 45G are arranged so as to be positioned at positions displaced from each other by 180° in terms of a mechanical angle (in point symmetry with respect to the rotary axis RA), and the third salient pole group 43G and the sixth salient pole group 46G are arranged so as to be positioned at positions displaced from each other by 180° in terms of a mechanical angle (in point symmetry with respect to the rotary axis RA). On these six salient pole groups, corresponding coil groups are respectively mounted, and a U-phase current is supplied to the first coil group 51G and the fourth coil group 54G, a V-phase current is supplied to the second coil group 52G and the fifth coil group 55G, and a W-phase current is supplied to the third coil group 53G and the sixth coil group 56G.

In this manner, the salient pole groups which form a pair formed of the first salient pole group 41G and the fourth salient pole group 44G are arranged so as to be positioned at positions displaced from each other by 180° in terms of a mechanical angle, and electric currents of the same phases are supplied to the coil groups which respectively correspond to these pair of salient pole groups. Accordingly, both salient pole groups are excited with a rotary axis RA sandwiched therebetween and hence, it is possible to acquire a motor which is rotated smoothly and stably without causing a "problem due to eccentric excitation".

As can be understood from the above-mentioned (1) to (4), according to the motor 10 of the embodiment 1, it is possible to obtain a motor which has a relatively large number of poles while suppressing a size and a weight of the motor (while realizing downsizing and the reduction in weight of the motor). Further, by increasing the number of poles, the motor can output a high torque mainly at the time of starting the motor and at the time of operating the motor at a low speed. In this manner, as a result, it is possible to provide a motor also suitable for direct driving which has a relatively large number of poles thus outputting a high torque while suppressing a size and a weight of the motor (while realizing downsizing and the reduction in weight of the motor).

(5) In the motor 10 according to the embodiment 1, the first coil group 51G and the fourth coil group 54G are connected in series, the second coil group 52G and the fifth coil group 55G are connected in series, and the third coil group 53G and the sixth coil group 56G are connected in series.

For example, if the first coil group 51G and the fourth coil group 54G are connected in parallel, one ends of the respective coil groups are connected to a node of a power lead wire in a collective manner, and the other ends of the respective coil groups are connected to another nodes respectively.

On the other hand, according to the motor 10 of the embodiment 1, two coil groups disposed in point symmetry with respect to the rotary angle (in the above-mentioned embodiment, the first coil group 51G and the fourth coil group 54G) are connected in series. Accordingly, the collective connection of the coil groups to a specific node described above can be eliminated and hence, a wiring space can be omitted compared to a case where the coil groups are connected in parallel whereby the further small sizing and the further reduction in weight of the motor can be realized.

(6) Conventionally, with respect to a motor where a diameter Φ of the stator is set to a value which falls within a range of 40 mm<Φ<200 mm, and the number of magnetic poles which the permanent magnet has and/or the number of salient poles fall/falls within a range of from 60 to 240, that is, with respect to a motor having a large number of poles, it has been difficult to realize such a motor.

According to the motor 10 of the embodiment 1, even in a case where a diameter Φ of the stator is set to a value which falls within a range of 40 mm<Φ<200 mm, and the number of magnetic poles which the permanent magnet has and/or the number of salient poles fall/falls within a range of from 60 to 240, that is, with respect to a motor having a large number of poles, it is possible to realize a desired motor suitable for such a case.

(7) With respect to the motor having a narrow slot width where a distance between the salient poles disposed adjacently to each other is set to a value which falls within a range of from 2.1 to 3.0 times as large as a diameter of the winding, conventionally, it has been difficult to realize such a motor.

According to the motor 10 of the embodiment 1, even in a case where a width of the slot is narrow compared to a diameter of the winding such that a distance between the salient poles disposed adjacently to each other is set to a value which falls within a range of from 2.1 times to 3.0 times as large as the diameter of the winding, it is possible to realize a desired motor suitable for such a case.

In the embodiment 1, the winding 58 is wound not in an overlapping manner but in a single winding manner in the slot SL. By winding the winding 58 in a single winding manner, even when the slot SL is extremely narrow, the winding 58 can be accommodated relatively easily so that the coil 50 can be easily mounted on the salient pole 40.

(8) The salient pole 40 according to the embodiment 1 is formed such that a length L1 in a direction perpendicular to the circumferential direction of the motor 10 is larger than a length L2 in the circumferential direction of the motor 10 as viewed in the −r direction. Accordingly, even when the number of poles is increased so that the length L2 inevitably becomes small, the length L1 is longer than the length L2 and hence, an area of a portion which forms the distal end of the salient pole 40 and oppositely faces the permanent magnet 24 can be ensured correspondingly whereby it is possible to realize the motor which can output a high torque while having the large number of poles.

(9) According to the motor 10 of the embodiment 1, the number of salient poles is 6n and the number of magnetic poles which the permanent magnet has is (6n±2) and hence, it is possible to acquire an advantageous effect (a) that the number of salient poles is an even number and hence, there is no possibility that "a problem caused by eccentric excitation" arises so that smooth and stable rotation can be acquired. Further, it is also possible to acquire an advantageous effect (b) that the difference between the number of salient poles and the number of magnetic poles which the permanent magnet has is 2 which is the least of the even number and hence, the least common number of number of salient poles and the number of magnetic poles which the permanent magnet has can be increased whereby the so-called pulsation of a cogging torque can be suppressed. By suppressing the pulsation of a cogging torque, not only vibration can be further suppressed but also an energy loss can be suppressed and hence, a torque at the time of stating the motor can be increased. Further, the motor can acquire smooth and stable rotation.

(10) It is expected that a motor for direct driving can output a high torque at the time of starting the motor and at the time of operating the motor at a low speed and that the motor can acquire smooth and stable rotation.

The motor 10 according to the embodiment 1 can output a high torque also at the time of starting the motor and at the time of operating the motor at a low speed, and can acquire smooth and stable rotation by suppressing vibrations and pulsations of a cogging torque because of the following reasons (a) to (c). (a) The number of poles is relatively large. (b) The salient pole groups excited in the same phase are arranged as a pair at positions displaced from each other by 180° in terms of a mechanical angle. (c) The number of magnetic poles which the permanent magnet 24 of the rotor 20 has and the number of salient poles have a predetermined relationship (an arrangement pitch of the permanent magnet 24 and an arrangement pitch of the salient poles 40 have a predetermined relationship) and the like. Accordingly, with the motor 10 according to the embodiment 1, it is possible to provide a motor suitable for direct driving.

5. Manufacturing Method of Manufacturing Motor 10 According to Embodiment 1

Next, the manufacturing method of manufacturing the motor 10 according to the embodiment 1 is described.

Figure 7:
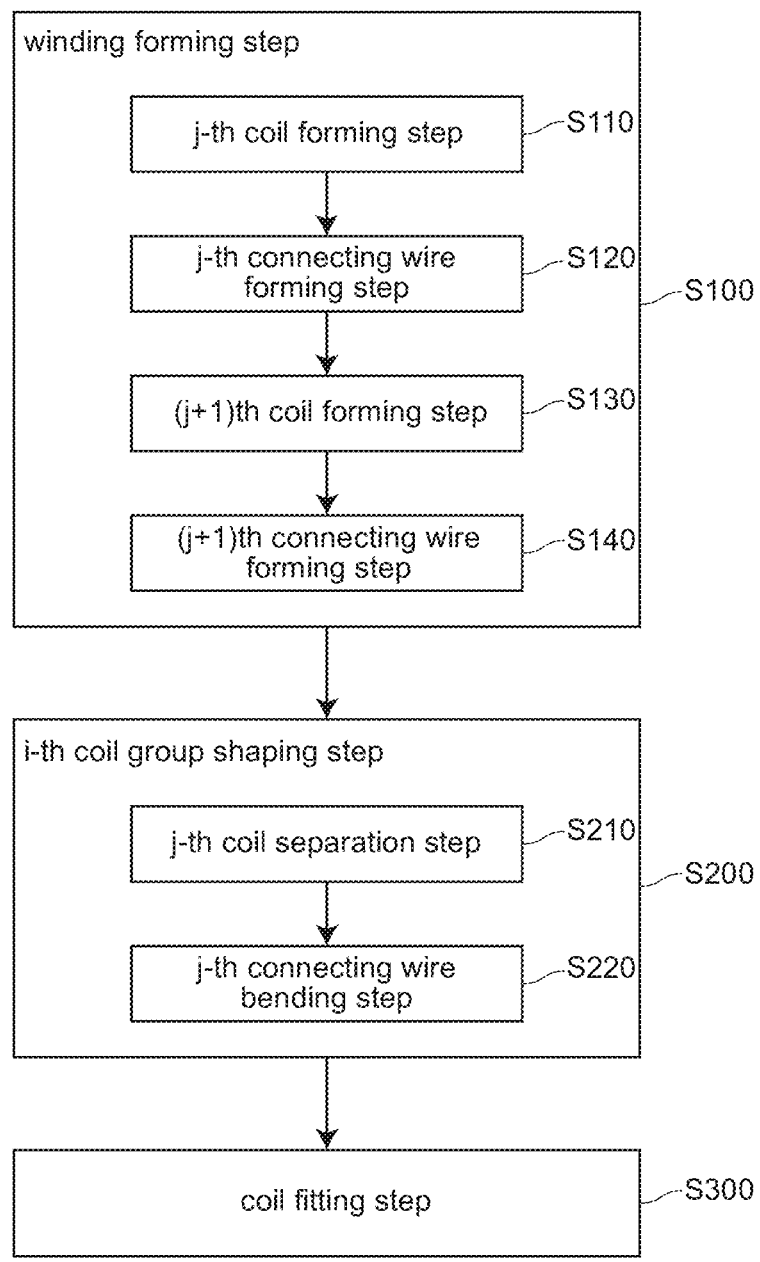
FIG. 7 is a flowchart for describing a manufacturing method of manufacturing the motor 10 according to the embodiment 1.

FIG. 7 is a flowchart for describing the manufacturing method of manufacturing the motor 10 according to the embodiment 1. FIG. 8A to FIG. 8F are views for describing the manufacturing method of manufacturing the motor 10 according to the embodiment 1. FIG. 9A and FIG. 9B are views for describing a change in size of a fitting portion 610 in the manufacturing method of manufacturing the motor 10 according to the embodiment 1.

The manufacturing method of manufacturing a motor for manufacturing the motor 10 according to the embodiment 1 includes, as shown in FIG. 7, a winding forming step S100, an i-th coil group shaping step S200, and a coil fitting step S300. Here, i is a natural number selected from a group ranging from 1 to 6.

Hereinafter, the manufacturing method of manufacturing the motor 10 according to the embodiment 1 is described along the respective steps.

(1) Winding Forming Step S100

The winding forming step S100 has at least a j-th coil forming step S110, a j-th connecting wire forming step S120, a (j+1)th coil forming step S130, and a (j+1)th connecting wire forming step S140 in this order (see FIG. 7). Here, j is a natural number selected from a group ranging from 1 to (n−2).

Figure 8A:
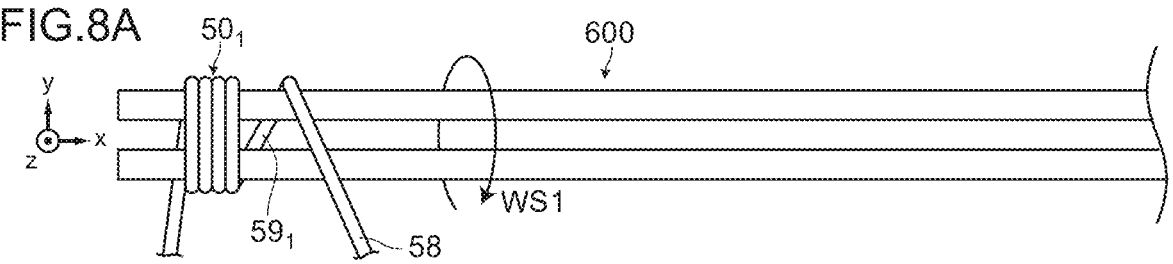
FIG. 8A to FIG. 8F are views for describing the manufacturing method for manufacturing the motor 10 according to the embodiment 1.
Figure 9A:
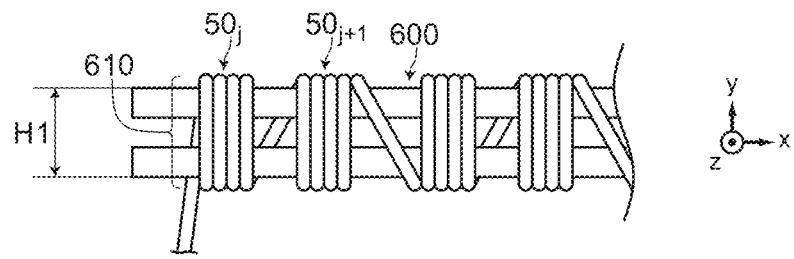
FIG. 9A and FIG. 9B are views for describing a change in size of a fitting portion 610 in the manufacturing method of manufacturing the motor 10 according to the embodiment 1.
Figure 9B:
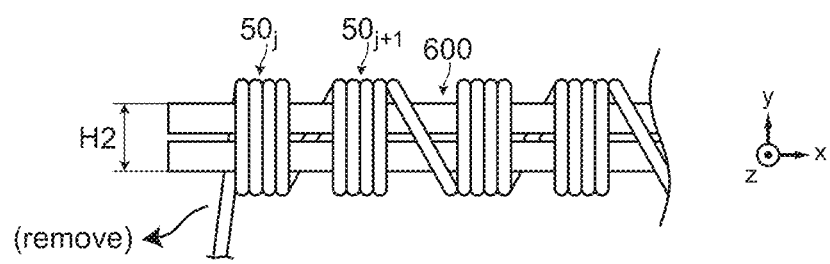

In the j-th coil forming step S110, assuming a case where an axis parallel to a longitudinal direction of a rod-like coil manufacturing tool 600 is defined as an x axis, an axis perpendicular to the x axis is defined as a y axis, and an axis perpendicular to the x axis and the y axis is defined as a z axis respectively, a j-th coil $50_j$ is formed by winding the winding 58 t times such that the winding 58 is wound in a first rotational direction WS1 around the coil manufacturing tool 600 when a yz plane is viewed in a plan view along an x axis (see FIG. 8A).

In the j-th connecting wire forming step S120, a j-th connecting wire $59_j$ which becomes a portion connecting the j-th coil $50_j$ and a (j+1)th coil $50_{j+1}$ to each other by winding the winding 58 by half way around in the first rotational direction WS1 is formed (see FIG. 8A). FIG. 8A shows a manner of forming a first connecting wire $59_1$ which becomes a portion connecting the first coil $50_1$ and a second coil $50_2$ (omitted in FIG. 8A) to each other.

Figure 8B:
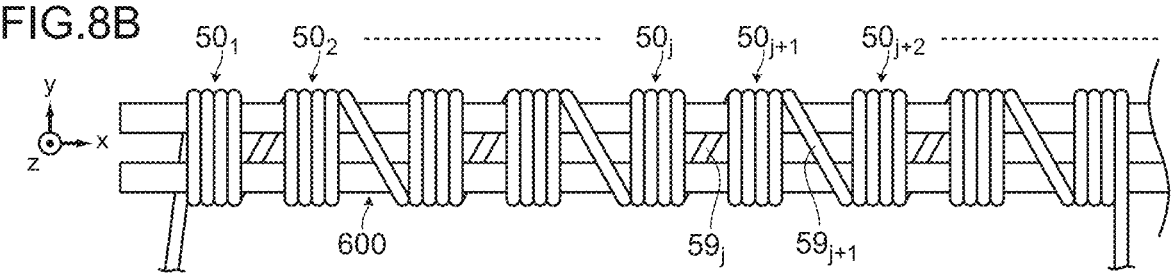

In the (j+1)th coil forming step S130, the (j+1)th coil $50_{j+1}$ is formed by winding the winding 58 t times such that the winding 58 is wound in the first rotational direction WS1 around the coil manufacturing tool 600 (see FIG. 8B).

In the (j+1)th connecting wire forming step S140, a (j+1)th connecting wire $59_{j+1}$ which becomes a portion connecting the (j+1)th coil $50_{j+1}$ and a (j+2)th coil $50_{j+2}$ to each other by winding the winding 58 by half way around in the first rotational direction SW1 is formed (see FIG. 8B).

By executing the above-mentioned winding forming step S100, the winding 58 can be wound around the coil manufacturing tool 600 so as to form the plurality of coils connected in series (see FIG. 8B).

(2) i-th Coil Group Shaping Step S200

The i-th coil group shaping step S200 has at least a j-th coil separation step S210 and a j-th connecting wire bending step S220 in this order (see FIG. 7).

In the j-th coil separation step S210, the j-th coil $50_j$ is separated from the coil manufacturing tool 600.

Figure 8C:
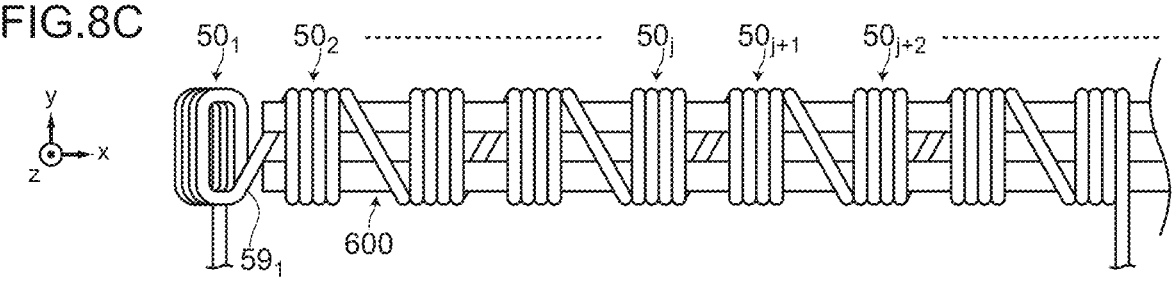

In the j-th connecting wire bending step S220, at least a portion of the j-th connecting wire $59_j$ is bent such that an inner diameter of the j-th coil $50_j$ and an inner diameter of the (j+1)th coil $50_{j+1}$ are viewable in the same direction. FIG. 8C shows a state where at least a first coil $50_1$ side of the first connecting wire $59_1$ is bent such that an inner diameter of the first coil $50_1$ is viewable in the same direction (−z direction) while separating the first coil $50_1$ from the coil manufacturing tool 600.

Figure 8D:
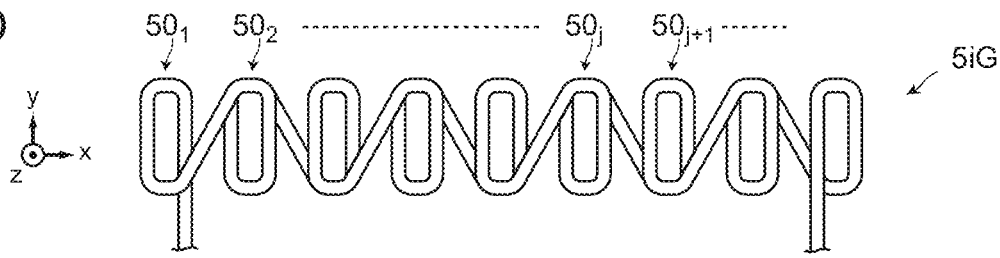

In this manner, by executing at least the j-th coil separation step S210 and the j-th connecting wire bending step S220, a plurality of coils can be shaped as a part of or a whole of an i-th coil group 5iG (see FIG. 8D). FIG. 8D shows a state where, with respect to nine coils as one example, the i-th coil group 5iG is shaped such that at least portions of the first connecting wire $59_1$ to the eighth connecting wire $59_8$ are respectively bent so that inner diameters of the first coil $50_1$ to the ninth coil $50_9$ are viewable in the −z direction.

(3) Coil Fitting Step S300

Figure 8E:
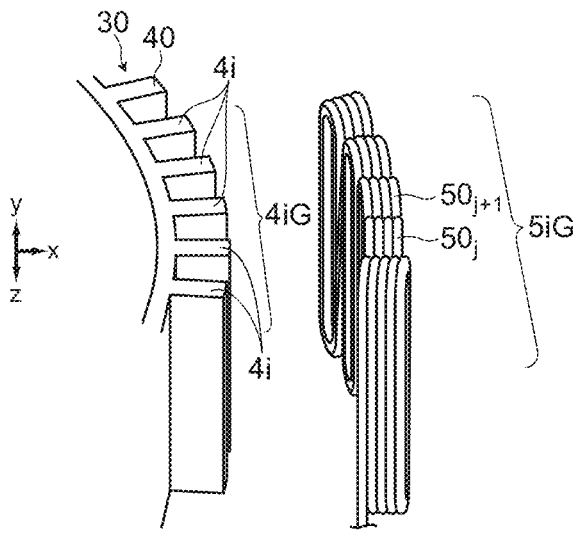
Figure 8F:
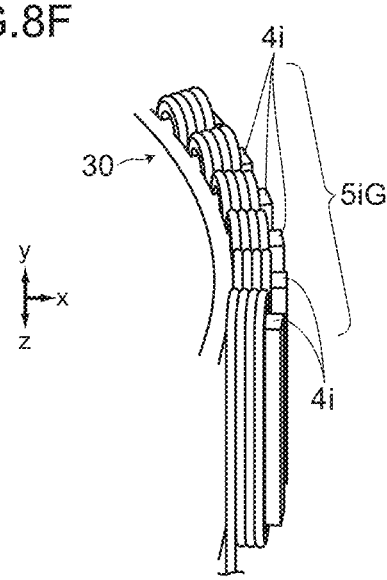

In the coil fitting step S300, the respective coils $50_j$ belonging to the i-th coil group 5iG are fitted on the corresponding i-th salient poles 4i in the i-th salient pole group 4iG in the stator 30 respectively (see FIG. 8E and FIG. 8F. In the drawings, out of coils belonging to the i-th coil group 5iG, only some coils are shown and illustration of other remaining coils is omitted).

As described above, by executing (1) the winding forming step S100, (2) the i-th coil group shaping step S200, and (3) the coil fitting step S300 in a repeated manner as much as necessary, 6n number of coils 50 are respectively mounted on 6n number of salient poles 40.

The coil manufacturing tool 600 is formed of a fitting portion 610 which is constituted of two rod-like independent members in the embodiment 1 (see FIG. 8A to FIG. 8F). However, the coil manufacturing tool 600 is not limited to such a configuration. Provided that the manufacturing method of manufacturing the motor 10 according to the present invention can be carried out, the coil manufacturing tool 600 may be made of any material, may be formed of any member, and may have any configuration. For example, in a modification shown in FIG. 9B, the coil manufacturing tool 600 is formed of one member having a rectangular shape or an approximately elliptical shape as viewed along the x axis (not shown in the drawing).

The first rotational direction WS1 is set as the CW direction as viewed along the x axis in the embodiment 1. However, in the manufacturing method of manufacturing the motor 10 according to the present invention, the first rotational direction WS1 is not limited to the CW direction. The first rotational direction WS1 may be set to the CCW direction.

Although the description of the winding forming step S100 of the embodiment 1 has been made with respect to the case where the number of turns t per one coil is set to 4 (t=4) in FIG. 8A to FIG. 8F, in the manufacturing method of manufacturing the motor 10 according to the present invention, the number of turns t per one coil is not limited to 4. For example, the winding may be wound while setting the number of turns t to 3.5 (t=3.5) or 4.5 (t=4.5) at a pitch of 0.5. Further, the winding may be wound while setting the number of turns t to a desired value t at a different pitch. In this manner, a value of t can be suitably selected corresponding to various sizes, a required torque characteristic, a required specification or the like. In the winding forming step S100 of the embodiment 1, the j-th connecting wire $59_j$ is formed by winding the winding 58 by half way around. In FIG. 8A to FIG. 8F, although the winding 58 is wound by approximately 0.5 times, a range of half way around is not limited to 0.5 times and can be suitably selected.

In the j-th coil separation step S210, in the example shown in FIG. 8C, only the first coil $50_1$ is separated from the coil manufacturing tool 600. That is, the example where coils are separated from the coil manufacturing tool 600 one by one is shown in FIG. 8C. However, in the manufacturing method of manufacturing the motor 10 according to the present invention, the coil separation method is not limited to such a method. For example, the coils may be separated from the coil manufacturing tool 600 unit by unit where each unit is consisting of a plurality of coils, or all coils belonging to the i-th coil group 5iG may be separated from the coil manufacturing tool 600 as a unit.

Further, the j-th coil separation step S210 and the j-th connecting wire bending step S220 may be continuously applied to each individual coil, or the j-th coil separation step S210 and the j-th connecting wire bending step S220 may be applied to a plurality of coils collectively.

Although FIG. 8A to FIG. 8F show the examples where the winding forming step S100, the i-th coil group shaping step S200, and the coil fitting step S300 are applied to nine coils, the present invention is not limited to such an example. For example, assuming the number of coils necessary for the i-th coil group 5iG corresponding to the i-th salient pole group 4iG as n number, the winding forming step S100, the i-th coil group shaping step S200, and the coil fitting step S300 may be applied to some coils necessary for the i-th coil group 5iG corresponding to the i-th salient pole group 4iG in a state where the number of some coils is set smaller than n number (n number of coils are divided). For example, when n is set to 20 (n=20), 20 coils may be divided into two groups each of which is consisting of 10 of coils, and these steps may be applied to the coils two times such that these steps are applied to the 10 coils each time.

Further, it is preferable that the winding forming step S100 and the i-th coil group shaping step S200 be applied to n number of coils necessary for the i-th coil group 5iG corresponding to the i-th salient pole group 4iG. For example, when n is set to 20 (n=20), it is preferable that these steps be applied to 20 coils collectively. Due to such an operation, the coils necessary for the i-th coil group 5iG corresponding to the i-th salient pole group 4iG can be manufactured collectively without performing an operation where coils are manufactured in a divided manner and, thereafter, the divided coils are connected to each other in a succeeding step. Accordingly, it is possible to prevent the increase of a resistance value caused by the connection of the coils thus reducing the number of steps.

6. Manner of Operation and Advantageous Effects of Manufacturing Method of Manufacturing Motor 10 According to Embodiment 1

(1) According to the manufacturing method of manufacturing the motor 10 according to the embodiment 1, in the winding forming step S100, a plurality of coils belonging to the i-th coil group 5iG are formed collectively and in a continuously connected manner by being wound around the coil manufacturing tool 600. In the i-th coil group shaping step S200, the coils are shaped in a state where the coils can be easily fitted on the salient poles respectively. Then, in the coil fitting step S300, the shaped coils which are formed in a continuously connected manner in advance are collectively fitted on the salient poles so that the coils are mounted on the salient poles respectively. With such a manufacturing method, unlike a conventional motor manufacturing method, it is unnecessary to mount coils in such a manner that winding is directly wound around salient poles while being pushed to bottoms of slots and hence, even when a width of the slot is narrow, the coils can be mounted on the salient poles easily and efficiently in the form suitable for mass production.

(2) With the manufacturing method of manufacturing the motor 10 according to the embodiment 1, the formation of the j-th coil 50$_j$ formed by winding the winding 58 t times around the coil manufacturing tool 600, the formation of the j-th connecting wire 59$_j$ by winding the winding 58 half way around the coil manufacturing tool 600, the formation of the (j+1)th coil 50$_{j+1}$ by winding the winding 58 t times around the coil manufacturing tool 600, and the formation of the (j+1)th connecting wire 59$_{j+1}$ by winding the winding 58 halfway around the coil manufacturing tool 600 are performed such that all coils are wound around in the same direction, that is, a first rotational direction WS1 without changing the winding direction in the course of the winding operation. Accordingly, the winding forming step S100 can be performed in the form suitable for efficient mass production.

(3) Change of Size of Fitting Portion 610

In the manufacturing method of manufacturing the motor 10 according to the above-mentioned embodiment 1, it is preferable that a size of the fitting portion 610 be changed as follows. The coil manufacturing tool 600 includes the fitting portion 610 disposed on an inner side of the formed coil. When a yz plane of the fitting portion 610 is viewed in a plan view along the x axis, in a winding forming step S100, a size of the fitting portion 610 in a longitudinal direction is set to a first size H1. In the j-th coil separation step S210 of the i-th coil group shaping step S200, the size of the fitting portion 610 is changed to a second size H2 which is smaller than the first size H1 by so-called narrowing of a width of the fitting portion 610, and the j-th coil 50$_j$ is separated from the fitting portion 610 (see FIG. 9A and FIG. 9B).

For example, as shown in FIG. 9A and FIG. 9B, the size of the fitting portion 610 may be collectively changed into the second size H2 from the first size H1 with respect to portions of the fitting portion 610 corresponding to all coils belonging to the i-th coil group 5iG.

In this manner, according to the manufacturing method of manufacturing a motor accompanying with a change in size of the fitting portion 610, in the j-th coil separation step S210, by narrowing a width of the fitting portion 610 by changing the size of the fitting portion 610 into the second size H2 which is smaller than the first size H1 maintained in the winding forming step S100, a gap can be formed between an inner side of the coil and an outer side of the fitting portion 610. Accordingly, the separation of the coil can be easily performed and hence, the j-th coil separation step S210 can be performed without collapsing a shape of the coil at the time of separating the coil and in the form suitable for further efficient mass production.

Embodiment 2

Hereinafter, a motor 12 according to an embodiment 2 is described.

Figure 10:
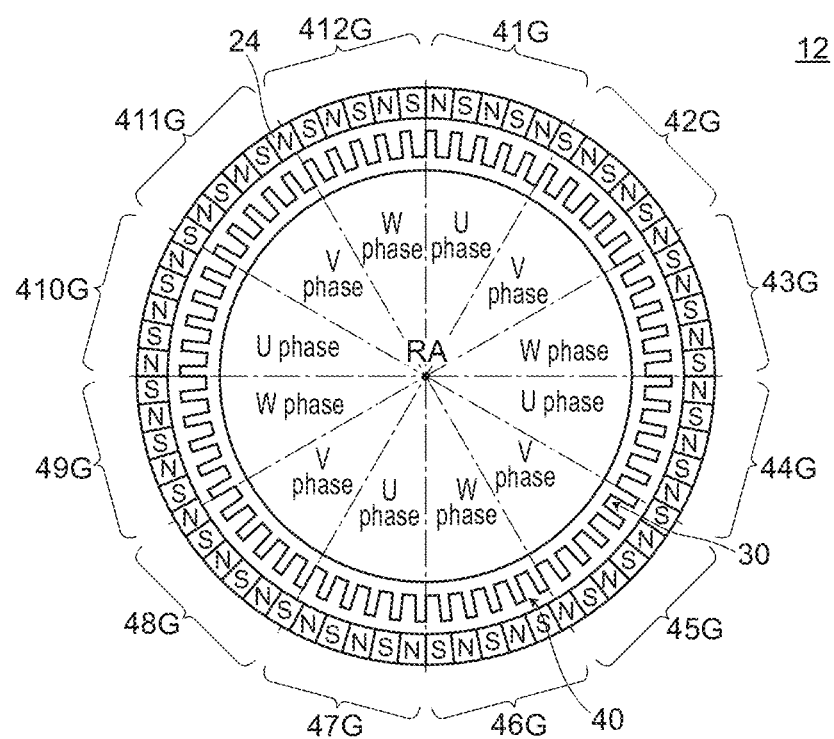
FIG. 10 is a view for describing an arrangement relationship between salient poles 40 and a permanent magnet 24 of a motor 12 according to an embodiment 2.

FIG. 10 is a view for describing an arrangement relationship between salient poles 40 and a permanent magnet 24 of the motor 12 according to the embodiment 2. Boundaries between a first salient pole group 41G to a twelfth salient pole group 412G are indicated by a chained line for the sake of convenience. In FIG. 10, the description is made mainly with respect to the salient poles 40 and the permanent magnet 24, and the description of other constitutional elements such as coils is omitted.

Although the motor 12 according to the embodiment 2 basically has substantially the same configuration as the motor 10 of the embodiment 1, the motor 12 according to the embodiment 2 differs from the motor 10 according to the embodiment 1 with respect to the number of salient poles, the number of coils and the like. That is, as shown in FIG. 10, the motor 12 according to the embodiment 2 includes twelve salient pole groups (the first salient pole group 41G to the twelfth salient pole group 412G) and includes twelve coil groups (the first coil group 51G to the twelfth coil group 512G) corresponding to the first salient pole group 41G to the twelfth salient pole group 412G.

1. Configuration of Motor 12 According to Embodiment 2

In the motor 12 according to the embodiment 2, the number of salient poles 40 which the stator 30 has is 12n in total (n: a natural number of 4 or more). These salient poles 40 are divided into twelve salient pole groups virtually. n is a number of salient poles which one salient pole group has. In FIG. 10, n is set to 5 (n=5).

In the stator 30, a first salient pole group 41G consisting of n number of first salient poles 41 is arranged. Subsequent to the first salient pole group 41G, a second salient pole group 42G to a twelfth salient pole group 412G each of which consists of n number of salient poles in the same manner as the first salient pole group 41G are arranged in this order along a circumferential direction of the stator 30. Further, the first salient pole group 41G and the seventh salient pole group 47G are arranged so as to be positioned at positions displaced from each other by 180° in terms of a mechanical angle (in point symmetry with respect to the rotary axis RA), the second salient pole group 42G and the eighth salient pole group 48G are arranged so as to be positioned at positions displaced from each other by 180° in terms of a mechanical angle (in point symmetry with respect to the rotary axis RA), the third salient pole group 43G and the ninth salient pole group 49G are arranged so as to be positioned at positions displaced from each other by 180° in terms of a mechanical angle (in point symmetry with respect to the rotary axis RA), the fourth salient pole group 44G and the tenth salient pole group 410G are arranged so as to be positioned at positions displaced from each other by 180° in terms of a mechanical angle (in point symmetry with respect to the rotary axis RA), the fifth salient pole group 45G and the eleventh salient pole group 411G are arranged so as to be positioned at positions displaced from each other by 180° in terms of a mechanical angle (in point symmetry with respect to the rotary axis RA), and the sixth salient pole group 46G and the twelfth salient pole group 412G are arranged so as to be positioned at positions displaced from each other by 180° in terms of a mechanical angle (in point symmetry with respect to the rotary axis RA).

In the same manner as the first coil group 51G shown in FIG. 3B, a first coil group 51G consisting of n number of coils connected in series is mounted on n number of first salient poles 41 of the first salient pole group 41G. Also with respect to a second coil group 52G to a twelfth coil group 512G, in the same manner as the first coil group 51G, a second coil group 52G to a twelfth coil group 512G respectively consisting of n number of coils connected in series are mounted on n number of respective second salient poles 42 of the second salient pole group 42G to twelfth salient pole 412 of the twelfth salient pole group 412G (not shown in FIG. 10).

A U-phase current is supplied to the first coil group 51G, the fourth coil group 54G, the seventh coil group 57G, and the tenth coil group 510G. A V-phase current is supplied to the second coil group 52G, the fifth coil group 55G, the eighth coil group 58G and the eleventh coil group 511G. A W-phase current is supplied to the third coil group 53G, the sixth coil group 56G, the ninth coil group 59G, and the twelfth coil group 512G (see the U phase, the V phase and the W phase shown in FIG. 10).

That is, the salient pole groups which form a pair with the rotary axis RA sandwiched therebetween are disposed at positions displaced from each other by 180° in terms of a mechanical angle, and an electric current of the same phase is supplied to the salient pole groups which form a pair. Accordingly, both salient pole groups which form a pair are excited at the same timing with the rotary axis RA sandwiched therebetween.

Besides the above-mentioned configuration, the motor 12 according to the embodiment 2 has substantially the same configuration as the motor 10 according to the embodiment 1 with respect to a shape of the salient pole, the mounting structure of coils, various size relationships and the like. The motor 12 according to the embodiment 2 can be manufactured by a method substantially equal to the method of manufacturing the motor 10 according to the embodiment 1.

2. Driving of Motor 12 According to Embodiment 2

Figure 11:
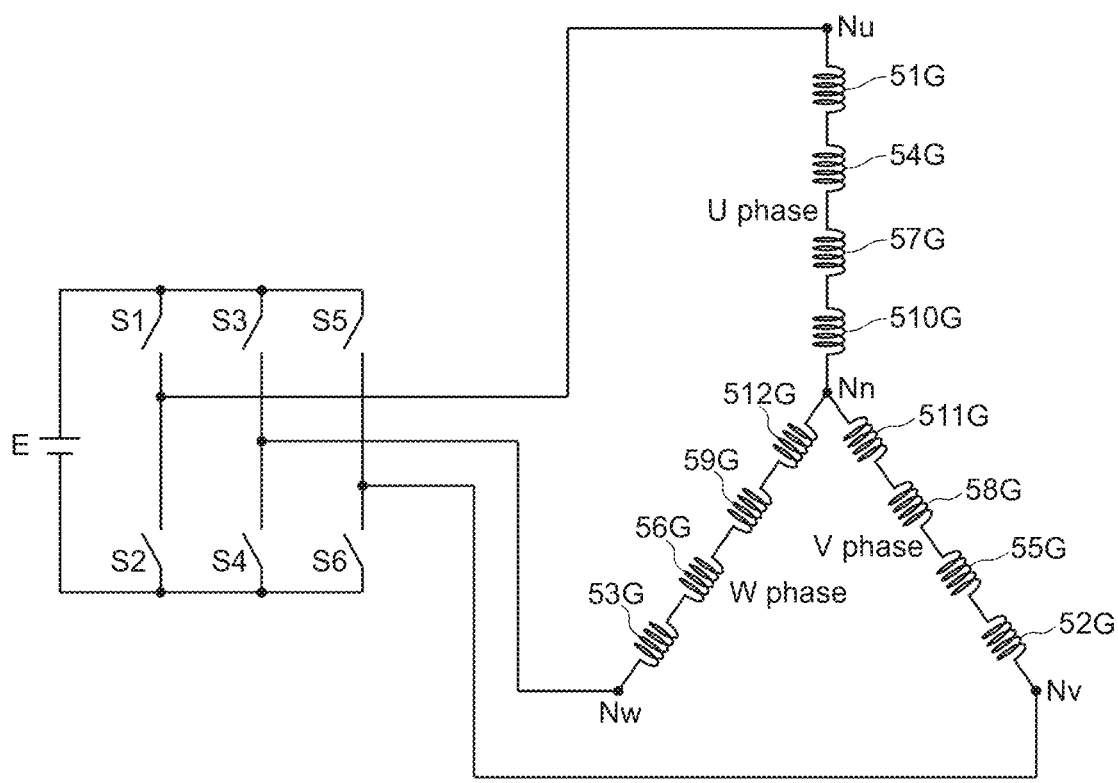
FIG. 11 is a circuit diagram for describing a connection relationship for driving the motor 12 according to the embodiment 2.
Figure 12:
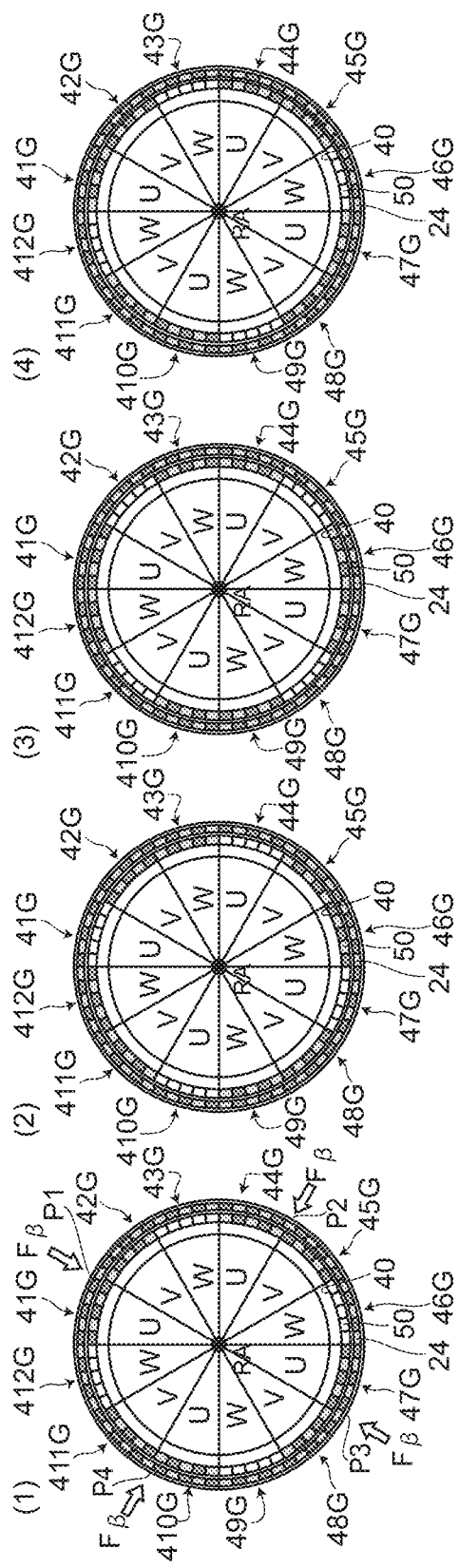
FIG. 12 is a view for describing a driving state of the motor 12 according to the embodiment 2.

FIG. 11 is a circuit diagram for describing a connection relationship for driving the motor 12 according to the embodiment 2. FIG. 12 is a view for describing a driving state of the motor 12 according to the embodiment 2. In FIG. 12, the salient poles 40 and the permanent magnet 24 are mainly described with the other constitutional elements being omitted from the drawings. In the first salient pole group 41G to the twelfth salient pole group 412G, the salient pole groups which are excited are indicated by hatching, and the salient pole groups which are not excited are indicated as blank portions.

(1) Drive Circuit

As shown in FIG. 11, a drive circuit of the motor 12 according to the embodiment 2 can be formed of a so-called star-connection in the same manner as the drive circuit of the motor 10 according to the embodiment 1

However, in the embodiment 2, for example, in case of a U phase, four coil groups (the first coil group 51G, the fourth coil group 54G, the seventh coil group 57G, and the tenth coil group 510G) are connected between a node Nu and a node Nn (the connection of coil groups not being limited to connection in series although the coil groups are connected in series in FIG. 11). The coil groups corresponding to a V phase and a W phase are also connected substantially with the same configuration as the coil groups corresponding to a U phase.

(2) Applying of Rotating Magnetic Field

In the above-mentioned drive circuit, substantially in the same manner as the driving method described in the embodiment 1, by controlling ON and OFF of the switches S1 to S6 suitably, an electric current flows between two nodes selected from three nodes consisting of the node Nu, a node Nv and a node Nw so that a rotating magnetic field is applied to the first salient pole group 41G to the twelfth salient pole group 412G.

As shown in FIG. 12, for example, in a first phase, an electric current is made to flow in the coil groups corresponding to a U phase and a V phase (the first coil group 51G, the second coil group 52G, the fourth coil group 54G, the fifth coil group 55G, the seventh coil group 57G, the eighth coil group 58G, the tenth coil group 510G, and the eleventh coil group 511G although not shown in the drawing) thus exciting the first salient pole group 41G, the second salient pole group 42G, the fourth salient pole group 44G, the fifth salient pole group 45G, the seventh salient pole group 47G, the eighth salient pole group 48G, the tenth salient pole group 410G, and the eleventh salient pole group 411G (see (1) of FIG. 12).

That is, in the motor 10 according to the embodiment 1, roughly speaking, the coil groups are excited on two sides in one turn of 360° (one side where the first salient pole group 41G and the second salient pole group 42G are arranged and the other side where the fourth salient pole group 44G and the fifth salient pole group 45G are arranged). On the other hand, in the motor 12 according to the embodiment 2, roughly speaking, the coil groups are excited on four sides in one turn of 360° (the side where the first salient pole group 41G and the second salient pole group 42G are arranged, the side where the fourth salient pole group 44G and the fifth salient pole group 45G are arranged, the side where the seventh salient pole group 47G and the eighth salient pole group 48G are arranged, and the side where the tenth salient pole group 410G and the eleventh salient pole group 411G are arranged).

Next, in a second phase, an electric current is made to flow in the coil groups corresponding to a V phase and a W phase. In the same manner as the first phase, roughly speaking, the coil groups are excited on four sides in one turn of 360° (the side where the second salient pole group 42G and the third salient pole group 43G are arranged, the side where the fifth salient pole group 45G and the sixth salient pole group 46G are arranged, the side where the eighth salient pole group 48G and the ninth salient pole group 49G are arranged, and the side where the eleventh salient pole group 411G and the twelfth salient pole group 412G are arranged) (see (2) of FIG. 12).

Also in a third phase and succeeding phases, in the same manner as described above, the coil groups in which an electric current is made to flow are shifted in the CW direction each time the phase changes so that the salient pole groups to be excited are shifted in the CW direction (see (3) of FIG. 12 and (4) of FIG. 12). These driving operations are repeated so that a rotating magnetic field is applied to the first salient pole group 41G to the twelfth salient pole group 412G. Along with such driving operations, the rotor 20 is rotated.

3. Manner of Operation and Advantageous Effects of Motor 12 According to Embodiment 2

(1) To describe for reference, in the motor 10 according to the embodiment 1, there may be a case where vibration or noise is slightly generated depending on a design condition.

As described previously, in driving the motor 10 according to the embodiment 1, to focus on only one drive phase, roughly speaking, an electric current is supplied to the coil groups on two sides in one turn of 360°. For example, in the first phase, as shown in (1) of FIG. 6, an electric current is made to flow in the coil groups corresponding to a U phase and a V phase, and the salient pole groups on one side (the first salient pole group 41G and the second salient pole group 42G) and salient pole groups on the other side (the fourth salient pole group 44G and the fifth salient pole group 45G) are excited at the same timing with the rotary axis RA sandwiched therebetween.

At this stage of driving operation, due to such excitations, a force $F_\alpha$ acts on the rotor 20 in the vicinity of a first point P1 and in the vicinity of a third point P3 (oppositely facing the first point P1 with the rotary axis RA sandwiched therebetween) so that the rotor 20 is attracted toward the rotary axis RA.

On the other hand, the third salient pole group 43G and the sixth salient pole group 46G are not excited and hence, a force similar to $F_\alpha$ does not act on the rotor 20 in the vicinity of a second point P2 and in the vicinity of a fourth point P4. That is, roughly speaking, the force $F_\alpha$ acts on only at two portions P1, P3 in one turn of 360°.

Accordingly, in the first phase, the rotor 20 is slightly deformed toward the inside in the vicinity of the first point P1 and in the vicinity of the third point P3, and is slightly deformed toward the outside relatively in the vicinity of the second point P2 and in the vicinity of the fourth point P4. Also in the second phase and succeeding phases, the rotor 20 is rotated while being slightly deformed at the points corresponding to the excited portions.

Because of such a phenomenon, vibration or noise is slightly generated in the motor 10 according to the embodiment 1 due to the deformation of the rotor caused by excitations depending on a design condition.

(2) On the other hand, in the motor 12 according to the embodiment 2, for example, in the first phase where an electric current is made to flow in the coil groups corresponding to a U phase and a V phase, as described above, the first salient pole group 41G and the second salient pole group 42G, the fourth salient pole group 44G and the fifth salient pole group 45G, the seventh salient pole group 47G and the eighth salient pole group 48G, and the tenth salient pole group 410G and the eleventh salient pole group 411G are excited at the same timing (see FIG. 1) of 12).

Due to such excitations, a force $F_\beta$ acts on the rotor 20 in the vicinity of a first point P1, in the vicinity of a second point P2, in the vicinity of a third point P3, and in a vicinity of a fourth point P4 so that the rotor 20 is attracted toward a rotary axis RA. That is, roughly speaking, the force $F_\beta$ acts on four portions P1 to P4 in one turn of 360°.

Accordingly, in the embodiment 2, the force $F_\beta$ by which the rotor 20 is attracted toward the rotary axis RA acts in a dispersed manner at four portions and hence, it is possible to provide the motor 12 where the above-mentioned vibration and/or noise are/is reduced compared to the motor 10 according to the embodiment 1.

To describe for reference, recently, there is a tendency that a thickness of a member which forms a rotor is decreased for decreasing a weight of a motor thus bringing about a state where the above-mentioned vibration or noise is liable to be generated. Accordingly, the motor 12 according to the embodiment 2 can be preferably introduced under such a circumstance.

The motor 12 according to the embodiment 2 has substantially the same configurations as the motor 10 according to the embodiment 1 with respect to points other than the number of salient pole groups, the number of coil groups and the like. Accordingly, the motor 12 according to the embodiment 2 has the same advantageous effects corresponding to the configurations of the motor 12 according to the embodiment 2 among advantageous effects which the motor 10 according to the embodiment 1 has.

Embodiment 3

Hereinafter, a motor 13 according to an embodiment 3 is described.

Figure 13:
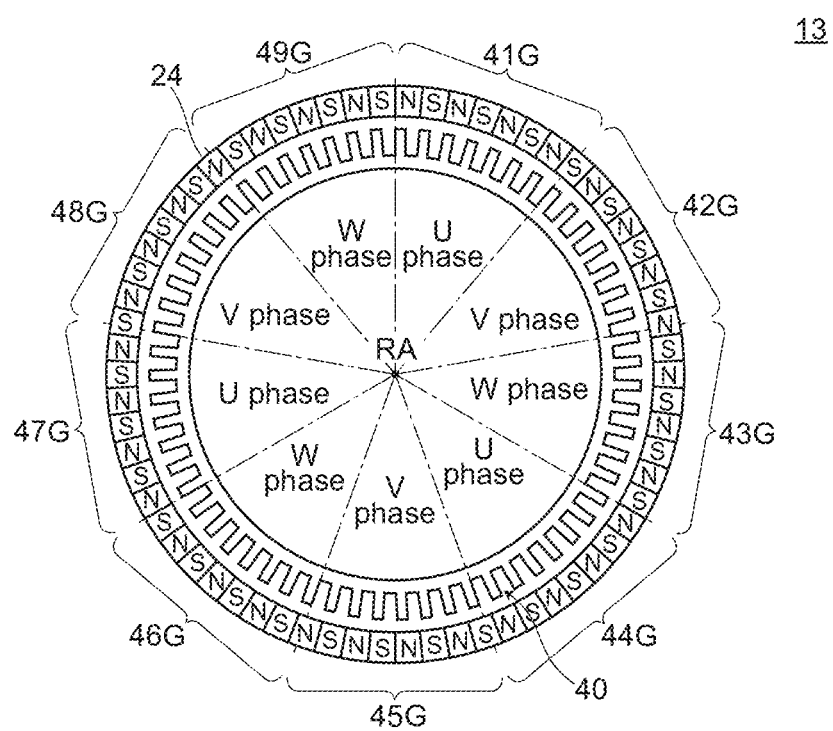
FIG. 13 is a view for describing an arrangement relationship between salient poles 40 and a permanent magnet 24 of a motor 13 according to an embodiment 3.

FIG. 13 is a view for describing an arrangement relationship between salient poles 40 and a permanent magnet 24 of the motor 13 according to the embodiment 3. Boundaries between a first salient pole group 41G to a ninth salient pole group 49G are indicated by a chained line for the sake of convenience. In FIG. 13, the description is made mainly with respect to the salient poles 40 and the permanent magnet 24, and the description of other constitutional elements such as coils is omitted.

1. Configuration of Motor 13 According to Embodiment 3

Although the motor 13 according to the embodiment 3 basically has substantially the same configuration as the motor 12 according to the embodiment 2, the motor 13 according to the embodiment 3 differs from the motor 12 according to the embodiment 2 with respect to the number of salient pole groups, the number of coil groups and the like. That is, as shown in FIG. 13, the motor 13 according to the embodiment 3 includes nine salient pole groups (the first salient pole group 41G to the ninth salient pole group 49G), and includes nine coil groups (the first coil group 51G to the ninth coil group 59G) corresponding to the first salient pole group 41G to the ninth salient pole group 49G.

In the motor 13 shown in FIG. 13, n is set to 7 (n=7).

A U-phase current is supplied to the first coil group 51G, the fourth coil group 54G, and the seventh coil group 57G. A V-phase current is supplied to the second coil group 52G, the fifth coil group 55G, and the eighth coil group 58G. A W-phase current is supplied to the third coil group 53G, the sixth coil group 56G, and the ninth coil group 59G (see the U phase, the V phase, and the W phase shown in FIG. 13).

In the motor 13 according to the embodiment 3, an electric current of the same phase is supplied to the salient pole groups arranged at positions displaced from each other by 120° in terms of a mechanical angle.

Besides the above-mentioned configuration, the motor 13 according to the embodiment 3 has substantially the same configuration as the motor 12 according to the embodiment 2 with respect to a shape of the salient pole, the mounting structure of coils, various size relationships and the like. The motor 13 according to the embodiment 3 can be manufactured by a method substantially equal to the method of manufacturing the motor 12 according to the embodiment 2.

2. Manner of Operation and Advantageous Effects of Motor 13 According to Embodiment 3

In the motor 13 according to the embodiment 3, for example, in the first phase where an electric current is made to flow in the coil groups corresponding to a U phase and a V phase, as described above, the first salient pole group 41G and the second salient pole group 42G, the fourth salient pole group 44G and the fifth salient pole group 45G, and the seventh salient pole group 47G and the eighth salient pole group 48G are excited at the same timing (not shown in the drawing).

Due to such excitations, a force $F_\gamma$ acts on the rotor 20 at three portions (three portions spaced apart from each other by 120° in terms of a mechanical angle) so that the rotor 20 is attracted toward a rotary axis RA. That is, roughly speaking, the force $F_\gamma$ acts on three portions in one turn of 360° (not shown in the drawing).

Accordingly, in the embodiment 3, the force $F_\gamma$ by which the rotor 20 is attracted toward the rotary axis RA acts in a dispersed manner at three portions and hence, it is possible to provide the motor 13 where the above-mentioned vibration and/or noise (see the description in the embodiment 2) are/is reduced compared to the motor 10 according to the embodiment 1.

The motor 13 according to the embodiment 3 has substantially the same configurations as the motor 12 according to the embodiment 2 with respect to points other than the number of salient pole groups, the number of coil groups and the like. Accordingly, the motor 13 according to the embodiment 3 has the same advantageous effects corresponding to the configurations of the motor 13 according to the embodiment 3 out of the advantageous effects which the motor 12 according to the embodiment 2 has.

Embodiment 4

A motor 14 according to an embodiment 4 (not shown in the drawing) basically has substantially the same configuration as the motor 10 according to the embodiment 1, the motor 12 according to the embodiment 2, and the motor 13 according to the embodiment 3. However, the motor 14 according to the embodiment 4 differs from the motor 10 according to the embodiment 1, the motor 12 according to the embodiment 2, and the motor 13 according to the embodiment 3 with respect to the manner of defining the number of salient pole groups, the number of coil groups and the like.

As described previously, the number of salient pole groups which the motor has and/or the number of coil groups which the motor has are/is six in the embodiment 1, twelve in the embodiment 2, and nine in the embodiment 3. However, in the present invention, the number of salient pole groups and the number of coil groups are not limited to the above-mentioned numbers. The motor according to the embodiment 4 has the following general configuration which is described in the form that the configuration embraces the respective configurations of the embodiment 1, the embodiment 2 and the embodiment 3.

1. Configuration of Motor 14 According to Embodiment 4

The motor 14 according to the embodiment 4 includes: a rotor 20 having a permanent magnet 24 where a magnetic pole having an N pole and a magnetic pole having an S pole are alternately arranged along a circumferential direction; and a stator 30 configured such that the stator 30 has a plurality of salient poles 40 on each of which a coil 50 is mounted, the plurality of salient poles 40 are arranged along the circumferential direction, and distal end surfaces of the salient poles 40 opposedly face a surface of the permanent magnet 24 on which the magnetic poles are arranged.

The number of the salient poles 40 which the stator 30 has is 3 mn (m: a natural number of 2 or more, n: a natural number of 4 or more).

In the stator 30, a (3k−2)th salient pole group consisting of n number of (3k−2)th salient poles, a (3k−1)th salient pole group consisting of n number of (3k−1)th salient poles, and a (3k)th salient pole group consisting of n number of (3k)th salient poles are arranged along the circumferential direction of the stator 30 in this order (k: a natural number selected from 1 to m).

In the above-mentioned configuration, "arranged along the circumferential direction of the stator 30 in this order" means that, in other words, the respective salient pole groups are arranged along the circumferential direction of the stator in order that the salient pole group numbers allocated to the respective salient pole groups are increased one by one.

Corresponding to these salient pole groups, the (3k−2)th coil group consisting of n number of coils connected in series is mounted on n number of (3k−2)th salient poles of the (3k−2)th salient pole group. The (3k−1)th coil group consisting of n number of coils connected in series is mounted on n number of (3k−1)th salient poles of the (3k−1)th salient pole group. The (3k)th coil group consisting of n number of coils connected in series is mounted on n number of (3k)th salient poles of the (3k)th salient pole group.

When the motor 14 according to the embodiment 4 is being driven, a U-phase current is supplied to the (3k−2)th coil group, a V-phase current is supplied to the (3k−1)th coil group, and a W-phase current is supplied to the (3k)th coil group.

On the other hand, each salient pole 40 is formed into a flat straight shape along a radial direction of the stator 30.

In the respective first salient pole group 41G to (3m)th salient pole group (expressed as 4(3m)G in general), the coils 50 are mounted on the salient poles 40 such that winding directions of the coils 50 are set opposite to each other between the salient poles 40 disposed adjacently to each other, and the coils 50 are connected to each other at a distal end side or a proximal end side of the salient pole 40 by a connecting wire 59 which is a part of a winding 58 which forms the coil between the salient poles 40 disposed adjacently to each other, and the connecting wires 59 have a reverse relationship with respect to the distal end side or the proximal end side between slots 34 disposed adjacently to each other.

In the motor 14 according to the embodiment 4, it is preferable that a distance between the salient poles 40 disposed adjacently to each other be set to a value which falls within a range of from 2.1 to 3.0 times as large as a diameter of the winding 58.

In the motor 14 according to the embodiment 4, it is preferable that a diameter $\Phi$ of the stator 30 be set to a value which falls within a range of 40 mm<$\Phi$<200 mm, and the number of magnetic poles which the permanent magnet 24 has and/or the number of salient poles 40 fall within a range of from 60 to 240.

In the motor 14 according to the embodiment 4, it is preferable that the number of magnetic poles which the permanent magnet 24 of the rotor 20 has be (3 mn±m). Here, m and n are selected such that 3 mn±m becomes an even number.

In the motor 14 according to the embodiment 4, roughly speaking, an electric current is supplied to the coil groups at m number of places in one turn of 360°. As a result, the salient pole groups at m number of places are excited at the same timing.

In the motor 14 according to the embodiment 4, the number of magnetic poles is (3 mn±m). That is, compared to the number of salient poles which is 3 mn, a surplus amount or a shortage amount of the number of magnetic poles which the permanent magnet 24 has is m. Accordingly, the displacement between the salient pole and the magnetic pole of the permanent magnet is distributed uniformly such that one displacement is distributed to the excited salient pole groups at m number of places. Accordingly, a force is applied to the rotor 20 in one turn of 360° in a well balanced manner so that it is possible to realize smoother rotation of the motor 14.

With respect to constitutional elements of the motor 14 according to the embodiment 4 which have substantially the same configuration as the configuration of the corresponding constitutional elements of the motor 10 according to the embodiment 1, the motor 12 according to the embodiment 2, and the motor 13 according to the embodiment 3, the descriptions used for describing the embodiment 1, the embodiment 2, and the embodiment 3 are basically adopted with modification.

2. Advantageous Effects of Motor 14 According to Embodiment 4

In the motor 14 according to the embodiment 4, in the stator 30, the (3k−2)th salient pole group consisting of n number of (3k−2)th salient poles, the (3k−1)th salient pole group consisting of n number of (3k−1)th salient poles, and the (3k)th salient pole group consisting of n number of (3k)th salient poles are arranged along the circumferential direction of the stator 30 in this order (k: a natural number selected from 1 to m). Further, corresponding to these salient pole groups, the (3k−2)th coil group consisting of n number of coils connected in series is mounted on n number of (3k−2)th salient poles of the (3k−2)th salient pole group. The (3k−1)th coil group consisting of n number of coils connected in series is mounted on n number of (3k−1)th salient poles of the (3k−1)th salient pole group. The (3k)th coil group consisting of n number of coils connected in series is mounted on n number of (3k)th salient poles of the (3k)th salient pole group.

In the motor 14 having such a configuration, due to excitation at the respective drive phases, a force $F_\beta$ acts on m number of places in one turn of 360° about a rotary axis RA of the rotor 30 (see description of the force $F_\beta$ in the embodiment 2).

Accordingly, in the embodiment 4, by adopting the design where the number of salient pole groups and/or the number of coil groups are/is not limited to 6 and are/is increased to 9, 12, 15, . . . 3m, it is possible to allow a force $F_\beta$ by which the rotor 20 is attracted toward the rotary axis RA is dispersed to m number of places. Accordingly, it is possible to provide the motor 14 where vibration and/or noise are/is further reduced.

The motor 14 according to the embodiment 4 has substantially the same configurations as the motor 10 according to the embodiment 1, the motor 12 according to the embodiment 2, and the motor 13 according to the embodiment 3 with respect to points other than the manner of defining the number of salient pole groups, the number of coil groups and the like. Accordingly, the motor 14 according to the embodiment 4 has the same advantageous effects corresponding to the configurations of the motor 14 according to the embodiment 4 out of the advantageous effects which the motor 10 according to the embodiment 1, the motor 12 according to the embodiment 2, and the motor 13 according to the embodiment 3 have.

Embodiment 5

Hereinafter, a motor 10a according to an embodiment 5 is described with reference to FIG. 14 and FIG. 15.

Figure 14:
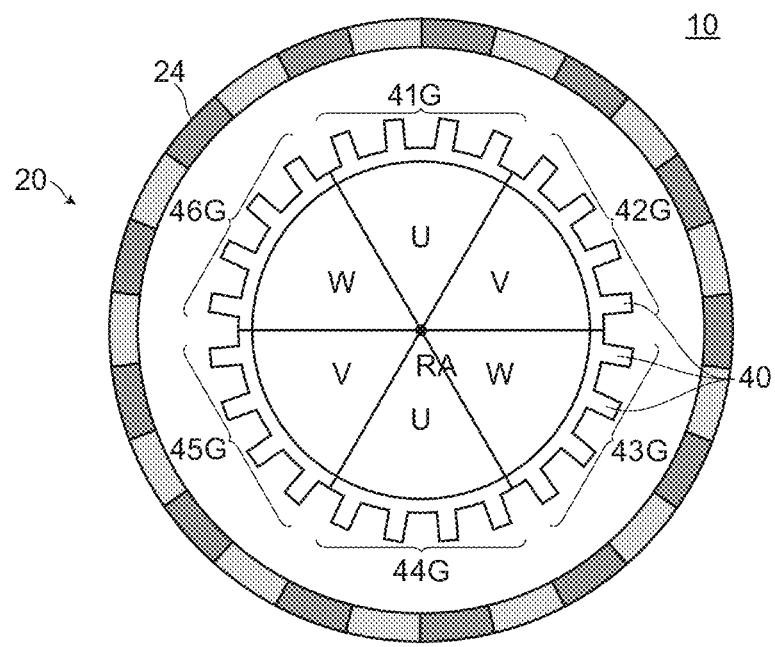
FIG. 14 is a view for describing an arrangement relationship between salient poles 40 and a permanent magnet 24 of the motor 10 according to the embodiment 1.

FIG. 14 is a view showing the arrangement relationship between the salient poles 40 and the permanent magnet 24 of the motor 10 according to the embodiment 1 for comparing the motor 10a according to the embodiment 5 with the motor 10 according to the embodiment 1. FIG. 15 is a view showing the arrangement of salient poles 40 of the motor 10a according to the embodiment 5. In both drawings, the salient poles 40 and the permanent magnet 24 are mainly described with the other constitutional elements being omitted from the drawings.

1. Arrangement of Salient Poles 40 and Permanent Magnet 24 of Motor 10a According to Embodiment 5 (for Comparison Purpose)

Firstly, in the motor 10 according to the above-mentioned embodiment 1, as shown in FIG. 14, while the number of salient poles is 6n (n: a natural number of 4 or more), the number of magnetic poles which the permanent magnet 24 of a rotor 20 has is (6n±2). n number of salient poles 40 are respectively arranged while maintaining a pitch of 360°/6n from each other in terms of a mechanical angle.

In the motor 10 according to the embodiment 1, both the "number of pseudo salient poles" and the number of salient poles are 6n. That is, the relationship of "number of pseudo salient poles"=number of salient poles=6n is established.

For reference, in FIG. 14, a case is described where n is 4 (n=4), the number of salient poles is 24, the number of magnetic poles which the permanent magnet has is 26, and an arrangement pitch of the salient poles 40 is 15°. The least common number of "the number of pseudo salient poles (equal to the number of salient poles which is 24)" and the number of magnetic poles which the permanent magnet has (26) is 312.

With the motor 10 according to the embodiment 1, since the number of salient poles is 6n and the number of magnetic poles which the permanent magnet has is (6n±2), it is possible to acquire an advantageous effect (a) that "the number of pseudo salient poles (equal to the number of salient poles)" is an even number and hence, there is no possibility that "a problem caused by eccentric excitation" arises so that smooth and stable rotation can be acquired. Further, it is also possible to acquire an advantageous effect (b) that the difference between "the number of pseudo salient poles (equal to the number of salient poles)" and the number of magnetic poles which the permanent magnet has is 2 which is the least of the even number and hence, the least common number of "the number of pseudo salient poles (equal to the number of salient poles)" and the number of magnetic poles which the permanent magnet has can be increased and hence, the so-called pulsation of a cogging torque can be suppressed.

2. Configuration of Motor 10a According to Embodiment 5

On the other hand, although the motor 10a according to the embodiment 5 basically has substantially the same configuration as the motor 10 of the embodiment 1, the motor 10a according to the embodiment 5 differs from the motor 10 according to the embodiment 1 with respect to the relationship between the number of salient poles, "the number of pseudo salient poles" and the number of magnetic poles which the permanent magnet has, and rules relating to the arrangement of the salient poles.

Figure 15:
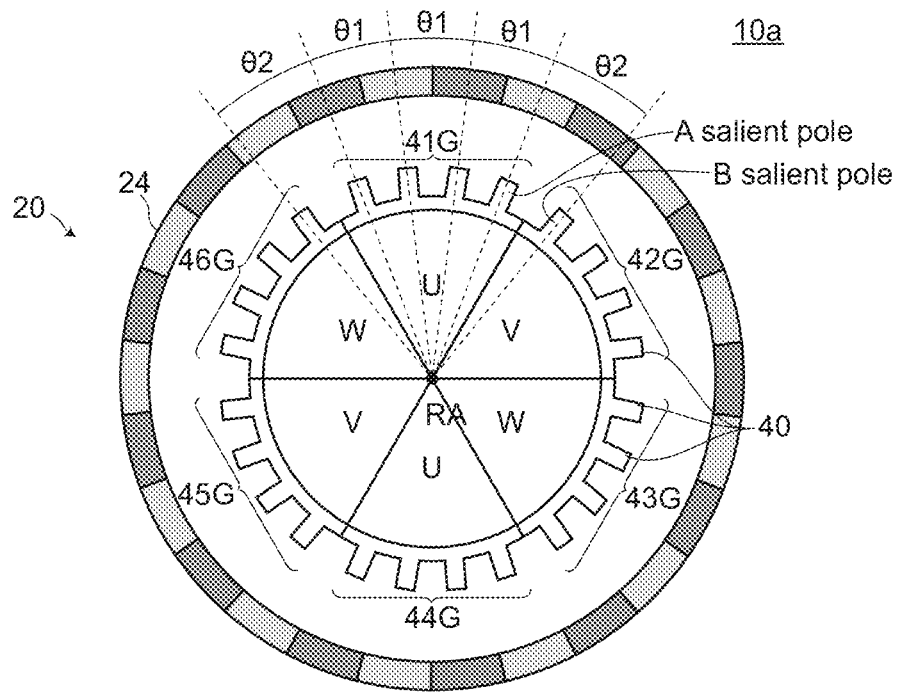
FIG. 15 is a view for describing an arrangement of salient poles 40 of a motor 10a according to an embodiment 5.

That is, in the motor 10a according to the embodiment 5, as shown in FIG. 15, the number of salient poles is 6n, and in each of a first salient pole group 41G to a sixth salient pole group 46G, n number of salient poles 40 belonging to the same salient pole group which are excited by an electric current of the same phase are arranged while maintaining an equal pitch $\theta1$ based on a pitch which is calculated based on "the number of pseudo salient poles" which is (i) a number larger than the actual number of salient poles 6n or (ii) a number smaller than the actual number of salient poles 6n. Further, an A salient pole positioned at an end of the salient pole group among n number of salient poles belonging to the salient pole group, and a B salient pole positioned at an end of another salient pole group disposed adjacently to the salient pole group among n number of salient poles belonging to such another salient pole group and disposed adjacently to the A salient pole are arranged while maintaining a pitch $\theta2$ which is larger than a pitch calculated based on "the number of pseudo salient poles". Here, the pitch $\theta2$ is larger by an amount obtained by dividing an increased amount pitch by 6 in the case of (i) or narrower by an amount that a reduced amount pitch is divided by 6 in case of (ii).

In this embodiment, it is preferable that "the number of pseudo salient poles" be larger than the actual number of salient poles 6n. When a relatively large number of salient poles are formed in a motor having a diameter of a predetermined size, a slot becomes extremely narrow basically. In this manner, by taking the direction that "the number of pseudo salient poles" is larger than the actual number of salient poles 6n so that the pitch $\theta2$ between the A salient pole and the B salient pole is increased, the degree of difficulty in mounting coils is also lowered.

In the motor 10a according to the embodiment 5, as shown in FIG. 15, it is preferable that the number of salient poles be 6n, the number of magnetic poles which the permanent magnet 24 of the rotor 20 has be (6n+2), and in each of the first salient pole group 41G to the sixth salient pole group 46G, n number of salient poles 40 belonging to the salient pole group be arranged while maintaining a pitch $\theta1$ $(=360°/(6n+1))$ in terms of a mechanical angle, and the A salient pole positioned at the end of the salient pole group among n number of salient poles belonging to the salient pole group, and the B salient pole positioned at the end of another salient pole group among n number of salient poles belonging to such another salient pole group disposed adjacently to the salient pole group and disposed adjacently to the A salient pole be arranged while maintaining a pitch $\theta2$ $(=\{360°/(6n+1)\}+360°/(6n+1)/6)$ in terms of a mechanical angle therebetween.

Hereinafter, one example of such a configuration is specifically described with reference to FIG. 15.

In the motor 10a according to the embodiment 5 shown in FIG. 15, n is 4 (n=4), the number of salient poles is 24, and the number of magnetic poles which the permanent magnet has is 26. For example, to locally observe the salient poles 40 arranged in the first salient pole group 41G, "the number of pseudo salient poles" becomes (6n+1), that is, 25. In this case, an arrangement pitch of the salient poles 40 in the first salient pole group 41G becomes $\theta1$ $(=360°/(6n+1))$, that is, 14.4°. The A salient pole positioned at the end of the first salient pole group 41G among four salient poles belonging to the first salient pole group 41G, and the B salient pole positioned at the end of the second salient pole group 42G among four salient poles belonging to another salient pole group (second salient pole group 42G) disposed adjacently to the first salient pole group 41G and disposed adjacently to the A salient pole are arranged while maintaining the pitch $\theta2$ $(=\{360°/(6n+1)\}+360°/(6n+1)/6)$, that is, 16.8°.

The least common number of "the number of pseudo salient poles (25)" and the number of magnetic poles which the permanent magnet has (26) is 650.

Also in each of the second salient pole group 42G to the sixth salient pole group 46G, the salient poles 40 are arranged in accordance with rules substantially equal to the above-mentioned rule.

3. Manner of Operation and Advantageous Effects of Motor 10a According to Embodiment 5

(1) As described above, in the motor 10a according to the embodiment 5, it is possible to acquire a following manner of operation and advantageous effect. (c) In a state where the number of magnetic poles which the permanent magnet has is set to 6n+2, the salient poles belonging to the same salient pole group are arranged while maintaining a pitch of 360°/(6n+1) in terms of a mechanical angle and hence, to locally observe the inside of the same salient pole group, "the number of pseudo salient poles" becomes (6n+1) so that the difference between "the number of pseudo salient poles" and the number of magnetic poles which the permanent magnet has becomes minimal, that is 1. Accordingly, the least common number of "the number of pseudo salient poles" and the number of magnetic poles which the permanent magnet has can be further increased compared to the least common number in the motor 10 according to the embodiment 1 and hence, pulsation of a cogging torque can be further suppressed.

For example, a comparison is made in the following table with respect to the number of salient poles, "the number of pseudo salient poles" based on an arrangement pitch of the salient poles, the number of magnetic poles which the permanent magnet has, and the least common number of "the number of pseudo salient poles" and the number of magnetic poles which the permanent magnet has between the motor 10 according to the embodiment 1 shown in FIG. 14 and the motor 10a according to the embodiment 5 shown in FIG. 15.

|     |                                                                                      | motor 10 (FIG. 14) | motor 10a (FIG. 15) |
| --- | ------------------------------------------------------------------------------------ | ------------------ | ------------------- |
| (1) | number of salient poles                                                              | 6n = 24            | 6n = 24             |
| (2) | "number of pseudo salient poles" based on arrangement pitch of salient poles         | 6n = 24            | 6n + 1 = 25         |
| (3) | number of magnetic poles which permanent magnet has                                  | 6n + 2 = 26        | 6n + 2 = 26         |
| (4) | least common number of (2) and (3)                                                   | 312                | 650                 |

As shown in FIG. 14, FIG. 15 and the table described above, even if the motor 10 according to the embodiment 1 and the motor 10a according to the embodiment 5 have substantially the same size, the motor 10a according to the embodiment 5 can have the considerably large least common number than the motor 10 according to the embodiment 1 and hence, the motor 10a according to the embodiment 5 can further suppress the pulsation of a cogging torque. Further, while suppressing vibration by suppressing the pulsation of a cogging torque, the motor 10a according to the embodiment 5 can further enhance a torque at the time of starting the motor 10a by suppressing an energy loss. Still further, the motor 10a according to the embodiment 5 can further acquire smooth and stable rotation.

(2) In the motor 10a according to the embodiment 5, it is possible to acquire a following manner of operation and advantageous effect. (d) The A salient pole positioned at the end of the salient pole group among n number of salient poles belonging to the salient pole group, and the B salient pole positioned at the end of another salient pole group among n number of salient poles belonging to such another salient pole group disposed adjacently to the salient pole group and disposed adjacently to the A salient pole are arranged while maintaining a pitch of {360°/(6n+1)}+360°/(6n+1)/6 in terms of a mechanical angle therebetween. With such a configuration, the salient pole groups which form a pair can be arranged at positions where the salient pole groups which form a pair (eventually the salient poles belonging to these salient pole groups) are displaced from each other by a mechanical angle of just 180° while eliminating an empty pitch amounting one salient pole and hence, it is possible to acquire a motor which performs smooth and stable rotation by suppressing "a problem caused by eccentric excitation".

Here, assuming a case where the whole circumference of 360° is divided by (6n+1) and the 6n number of salient poles are arranged at these dividing positions, a divided space where the salient pole is not arranged actually is formed as an empty space by an amount corresponding to one salient pole. Further, the whole circumference of 360° is divided by the odd number and hence, the salient pole groups which forma pair (eventually, the salient poles belonging to these salient pole groups) are not arranged at positions displaced from each other by 180° in terms of a mechanical angle. Accordingly, in this case, "a problem caused by eccentric excitation" remains more or less.

The motor 10a according to the embodiment 5 has substantially the same configurations as the motor 10 according to the embodiment 1 with respect to points other than the relationship between the number of salient poles, the number of pseudo salient poles which becomes a basis of calculation for determining an arrangement pitch of the salient poles and the number of magnetic poles which the permanent magnet has, and rule for arranging the salient poles. Accordingly, the motor 10a according to the embodiment 5 has the same advantageous effects corresponding to the configurations of the motor 10a according to the embodiment 5 among advantageous effects which the motor 10 according to the embodiment 1 has.

Embodiment 6

Hereinafter, a motor 10b according to an embodiment 6 is described.

Although the motor 10b according to the embodiment 6 (not shown in the drawing, hereinafter, all constitutional elements of the motor 10b according to the embodiment 6 being omitted from drawings) basically has substantially the same configuration as the motor 10 of the embodiment 1, the motor 10b according to the embodiment 6 differs from the motor 10 according to the embodiment 1 with respect to the relationship between the number of salient poles and the number of magnetic poles which a permanent magnet has. That is, the motor 10b according to the embodiment 6 is configured such that the number of salient poles is 6n, and the number of magnetic poles which a permanent magnet 24 of a rotor 20 has is (6n±4).

With the motor 10b according to the embodiment 6, it is possible to acquire an advantageous effect (a) that the number of salient poles is an even number, there is no possibility that "a problem caused by eccentric excitation" arises so that smooth and stable rotation can be acquired. Further, it is also possible to acquire an advantageous effect (b) that the difference between the number of salient poles and the number of magnetic poles which the permanent magnet has is 4 and hence, the least common number of number of salient poles and the number of magnetic poles which the permanent magnet has can be relatively increased and hence, the so-called pulsation of a cogging torque can be suppressed.

The motor 10b according to the embodiment 6 has substantially the same configurations as the motor 10 according to the embodiment 1 with respect to points other than the relationship between the number of salient poles and the number of magnetic poles which the permanent magnet has. Accordingly, the motor 10b according to the embodiment 6 has the same advantageous effects corresponding to the configurations of the motor 10b according to the embodiment 6 out of the advantageous effects which the motor 10 according to the embodiment 1 has.

Although the present invention has been described based on the above-mentioned embodiments, the present invention is not limited to the above-mentioned embodiments. The present invention can be carried out without departing from the gist of the present invention, and, for example, the following modifications are also conceivable.

(1) The number, materials, shapes, positions, sizes and the like of the constitutional elements described in the above-mentioned embodiments are provided for an exemplifying purpose, and these matters can be changed within a scope where advantageous effects of the present invention are not impaired.

(2) In the respective embodiments, the description has been made using a so-called outer rotor type motor where the stator 30 is disposed on a side close to a rotary axis RA (a side in a −r direction) and the rotor 20 is disposed on a side remote from the rotary axis RA (a side in an r direction). However, the present invention is not limited to the outer rotor type motor. The present invention may be applied to a so-called inner rotor type motor where the rotor 20 is disposed on a side close to a rotary axis RA (a side in a −r direction) and the stator 30 is disposed on a side remote from the rotary axis RA (a side in an r direction).

(3) The manufacturing method of the motor 10 according to the embodiment 1 is the method where the coils are formed collectively and in a continuously connected manner in the winding forming step S100, the coils are shaped in a state that the coil can be easily fitted on the salient pole in the i-th coil group shaping step S200, and the coils are mounted on the salient poles such that the continuously connected coils which are shaped in advance are collectively fitted on the salient poles in the coil fitting step S300. However, the manufacturing method of the motor 10 according to the embodiment 1 is not limited to such a method. For example, the motor 10 according to the present invention can be acquired also by a method where the coils 50 are mounted on the salient poles 40 by directly winding the winding 58 around the salient poles 40 while pushing the winding 58 into bottoms of the slots SL.

(4) As a manufacturing method of a motor described in "Description of Embodiments" described heretofore, the manufacturing method of the motor 10 according to the embodiment 1 has been described. However, the present invention is not limited to the motor 10 according to the embodiment 1. Besides the motor 10 according to the embodiment 1, the manufacturing method is applicable to the motor 10a according to the embodiment 5, the motor 10b according to the embodiment 6 and the motors according to the modifications.

(5) The description has been made with a premise that the motors acquired by the respective embodiments are used for direct driving. However, the present invention is not limited to such an application. For example, the motors acquired by the respective embodiments may be used as a motor which does not perform direct driving by interposing a reduction gear, for example.

(6) In the motor 10 according to the embodiment 1, as shown in FIG. 5, the first coil group 51G and the fourth coil group 54G are connected in series, the second coil group 52G and the fifth coil group 55G are connected in series, and the third coil group 53G and the sixth coil group 56G are connected in series. However, the present invention is not limited such configuration. For example, these coil groups may be connected parallel to each other.

As a circuit which drives the motor 10 according to the embodiment 1, as shown in FIG. 5, the circuit having the configuration where the first coil group 51G to the sixth coil group 56G are connected by a so-called star connection is adopted. However, the present invention is not limited to such a circuit. The present invention may adopt a circuit where other connection methods such as delta connection are used, for example.

What is claimed is:

1. A motor comprising:
  a rotor having a permanent magnet where a magnetic pole having an N pole and a magnetic pole having an S pole are alternately arranged along a circumferential direction; and
  a stator configured such that the stator has a plurality of salient poles on each of which a coil is mounted, the plurality of salient poles are arranged along the circumferential direction, and distal end surfaces of the salient poles opposedly face a surface of the permanent magnet on which the magnetic poles are arranged, wherein
  the number of salient poles which the stator has is 3(mn) (m: a natural number of 2 or more, n: a natural number of 4 or more),
  the coils having the same number of windings as one another are mounted on each of all the plurality of salient poles of the stator,
  in the stator, a (3k−2)th salient pole group consisting of (n) number of (3k−2)th salient poles disposed adjacently to each other, a (3k−1)th salient pole group consisting of (n) number of (3k−1)th salient poles disposed adjacently to each other, and a (3k)th salient pole group consisting of n number of (3k)th salient poles disposed adjacently to each other are arranged along the circumferential direction of the stator in this order (k: a natural number selected from 1 to m),
  a (3k−2)th coil group consisting of (n) number of said coils connected in series is mounted on (n) number of (3k−2)th salient poles, disposed adjacently to each other, of the (3k−2)th salient pole group, a (3k−1)th coil group consisting of (n) number of said coils connected in series is mounted on (n) number of said (3k−1) salient poles, disposed adjacently to each other, of the (3k−1)th salient pole group, and a (3k)th coil group consisting of (n) number of said coils connected in series is mounted on (n) number of said (3k)th salient poles, disposed adjacently to each other, of the (3k)th salient pole group,
  a U-phase current is supplied to the (3k−2)th coil group, a V-phase current is supplied to the (3k−1)th coil group, and a W-phase current is supplied to the (3k)th coil group,
  said each salient pole is formed into a flat straight shape throughout from a proximal end side to a distal end side of the salient pole along a radial direction of the stator, and
  in the respective first to (3m)th salient pole groups,
    the coils are mounted on the salient poles such that winding directions of the coils are set opposite to each other between the salient poles disposed adjacently to each other, and
    the coils are connected to each other at the distal end side or the proximal end side of the salient pole by a connecting wire which is a part of a winding which forms the coil between the salient poles disposed adjacently to each other, and the connecting wires have a reverse relationship with respect to the distal end side or the proximal end side between slots disposed adjacently to each other.

2. The motor according to claim 1, wherein a distance between the salient poles disposed adjacently to each other is set to a value which falls within a range of from 2.1 to 3.0 times as large as a diameter of the winding.

3. The motor according to claim 1, wherein a diameter (φ) of the stator is set to a value which falls within a range of 40 mm<(φ)<200 mm, and the number of magnetic poles which the permanent magnet has and/or the number of salient poles fall/falls within a range of from 60 to 240.

4. The motor according to claim 1, wherein the number of magnetic poles which the permanent magnet of the rotor has is (3 mn±m) (m and n being selected such that 3 mn±m becomes an even number).

5. The motor according to claim 1, wherein the motor is of a direct driving type which is free from a reduction gear for driving the rotor.

* * * * *